(12) United States Patent
Boldyrev et al.

(10) Patent No.: US 9,589,006 B2
(45) Date of Patent: *Mar. 7, 2017

(54) METHOD AND APPARATUS FOR MULTIDIMENSIONAL DATA STORAGE AND FILE SYSTEM WITH A DYNAMIC ORDERED TREE STRUCTURE

(71) Applicant: Nokia Corporation, Espoo (FI)

(72) Inventors: Sergey Boldyrev, Soderkulla (FI); Pavandeep Kalra, Shrewsbury, MA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 174 days.

This patent is subject to a terminal disclaimer.

(21) Appl. No.: 14/555,027

(22) Filed: Nov. 26, 2014

(65) Prior Publication Data

US 2015/0154239 A1 Jun. 4, 2015

Related U.S. Application Data

(63) Continuation of application No. 13/538,613, filed on Jun. 29, 2012, now Pat. No. 8,930,374.

(51) Int. Cl.
*G06F 17/30* (2006.01)
(52) U.S. Cl.
CPC .. *G06F 17/30336* (2013.01); *G06F 17/30241* (2013.01); *G06F 17/30333* (2013.01); *G06F 17/30477* (2013.01)

(58) Field of Classification Search
CPC ......... G06F 17/30336; G06F 17/30333; G06F 17/30241; G06F 17/30477

(Continued)

(56) References Cited

U.S. PATENT DOCUMENTS

| 5,204,958 A | 4/1993 | Cheng et al. |
| 5,666,528 A | 9/1997 | Thai |

(Continued)

OTHER PUBLICATIONS

Yun et al., "A Real-Time Mobile GIS based on the HBR-Tree for Location Based Services", The Journal of Computers & Industrial Engineering, vol. 51, Issue 1, Sep. 2006, pp. 58-71.*

(Continued)

*Primary Examiner* — Phuong Thao Cao
(74) *Attorney, Agent, or Firm* — Ditthavong & Steiner, P.C.

(57) ABSTRACT

An approach is provided to determine one or more dynamic ordered tree structures and transition tree structures (e.g., based on one or more transitions of a device) to facilitate querying and/or accessing data stores. An apparatus and method determines to generate at least one index structure, determines to associate index objects of the generated index structure with one or more data objects of at least one data store, determines to generate at least one transition index structure based on the at least one generated index structure, and determines to associate the transition index structure with index objects corresponding to one or more data objects of at least one data store based on a transition of a device. Also, the method and apparatus determines to generate at least one query, and determines to generate at least one transition index structure where a current index structure to resolve the query is absent.

20 Claims, 19 Drawing Sheets

(58) Field of Classification Search
USPC .................................................... 707/741
See application file for complete search history.

(56) References Cited

U.S. PATENT DOCUMENTS

| | | | |
|---|---|---|---|
| 5,806,065 | A | 9/1998 | Lomet |
| 5,878,413 | A | 3/1999 | Agrawal et al. |
| 7,139,337 | B2 | 11/2006 | Gonikberg |
| 7,330,854 | B2 | 2/2008 | Heuer et al. |
| 7,340,472 | B2 | 3/2008 | Makus et al. |
| 7,398,003 | B2 | 7/2008 | Horiuchi |
| 7,917,474 | B2 | 3/2011 | Passey et al. |
| 7,962,449 | B2 | 6/2011 | Giampaolo et al. |
| 7,975,229 | B2 | 7/2011 | Parupudi et al. |
| 7,984,089 | B2 | 7/2011 | Gates et al. |
| 8,510,269 | B2* | 8/2013 | Witt .................. G06F 17/30321 707/635 |
| 8,510,860 | B2 | 8/2013 | Thurber et al. |
| 8,612,679 | B2 | 12/2013 | Schnapp et al. |
| 8,756,216 | B1* | 6/2014 | Ramesh .............. G06F 17/3002 707/711 |
| 2002/0123994 | A1* | 9/2002 | Schabes .............. G06F 17/3061 |
| 2003/0088576 | A1 | 5/2003 | Hattori et al. |
| 2004/0068521 | A1* | 4/2004 | Haacke ............. G06F 17/30899 |
| 2004/0267694 | A1 | 12/2004 | Sakai et al. |
| 2005/0074226 | A1 | 4/2005 | Horiuchi |
| 2005/0096841 | A1* | 5/2005 | Gedik ............... G06F 17/30333 701/408 |
| 2005/0193005 | A1 | 9/2005 | Gates et al. |
| 2005/0289110 | A1* | 12/2005 | Giampaolo .......... G06F 17/301 |
| 2006/0064424 | A1 | 3/2006 | Heuer et al. |
| 2006/0080303 | A1 | 4/2006 | Sargent et al. |
| 2006/0167592 | A1 | 7/2006 | Kudo et al. |
| 2006/0184566 | A1 | 8/2006 | Lo et al. |
| 2007/0016600 | A1* | 1/2007 | Bae ................... G06F 17/30333 |
| 2007/0094310 | A1 | 4/2007 | Passey et al. |
| 2007/0118651 | A1 | 5/2007 | Giampaolo et al. |
| 2007/0250477 | A1* | 10/2007 | Bailly ............... G06F 17/30241 |
| 2008/0016066 | A1 | 1/2008 | Kuznetsov et al. |
| 2008/0082490 | A1* | 4/2008 | MacLaurin ........ G06F 17/30864 |
| 2008/0229373 | A1 | 9/2008 | Ma et al. |
| 2008/0263193 | A1 | 10/2008 | Chalemin et al. |
| 2009/0083214 | A1 | 3/2009 | Konig et al. |
| 2009/0187587 | A1 | 7/2009 | Chatterjee et al. |
| 2010/0114905 | A1* | 5/2010 | Slavik ............... G06F 17/30241 707/743 |
| 2010/0114970 | A1 | 5/2010 | Marin |
| 2010/0145931 | A1 | 6/2010 | Chang et al. |
| 2010/0205181 | A1 | 8/2010 | Chidlovskii |
| 2010/0211525 | A1 | 8/2010 | West et al. |
| 2010/0309933 | A1 | 12/2010 | Stark et al. |
| 2011/0070863 | A1 | 3/2011 | Ma et al. |
| 2011/0138339 | A1 | 6/2011 | Webster et al. |
| 2011/0145195 | A1 | 6/2011 | Passey et al. |
| 2011/0145303 | A1* | 6/2011 | Boldyrev .......... G06F 17/30433 707/812 |
| 2011/0191692 | A1 | 8/2011 | Walsh et al. |
| 2011/0218972 | A1 | 9/2011 | Tofano |
| 2011/0238694 | A1 | 9/2011 | Carlsson et al. |
| 2011/0238830 | A1* | 9/2011 | Giampaolo ....... G06F 17/30067 709/224 |
| 2012/0041979 | A1* | 2/2012 | Lee .................... G06N 5/022 707/776 |
| 2012/0054195 | A1 | 3/2012 | Hu et al. |
| 2012/0100912 | A1 | 4/2012 | Kim et al. |
| 2012/0117067 | A1* | 5/2012 | Yakubovich ...... G06F 17/30327 707/737 |
| 2012/0166416 | A1 | 6/2012 | Murdock et al. |
| 2012/0166446 | A1* | 6/2012 | Bowman .......... G06F 17/30327 707/743 |
| 2012/0233147 | A1* | 9/2012 | Solheim ........... G06F 17/30336 707/709 |
| 2012/0277907 | A1* | 11/2012 | Kim ...................... B25J 9/1664 700/245 |
| 2012/0296913 | A1 | 11/2012 | Ash et al. |
| 2013/0066880 | A1 | 3/2013 | Schramm et al. |
| 2013/0211660 | A1 | 8/2013 | Mitchell |
| 2013/0232152 | A1* | 9/2013 | Dhuse ............... G06F 17/30321 707/741 |
| 2013/0275480 | A1* | 10/2013 | Dhuse ............... G06F 17/30321 707/829 |
| 2014/0006411 | A1* | 1/2014 | Boldyrev .......... G06F 17/30336 707/741 |

OTHER PUBLICATIONS

European Office Action for related European Patent Application No. 13809942.9-1952 dated Feb. 12, 2016, 9 Pages.
European Office Action for related European Patent Application No. 13809942.9-1952 dated Jan. 26, 2016, 1 Page.
Written Opinion of the International Searching Authority for Corresponding International Application No. PCT/FI2013/050620 mailed Sep. 12, 2013.
International Search Report for corresponding International No. PCT/FI2013/050620 mailed Sep. 12, 2013.
Patel et al., "STRIPES: An Efficient Index for Predicted Trajectories", In Proceedings of the 2004 ACM SIGMOD International Conference on Management of Data, 2004, pp. 635-646.
Bohm et al., "Searching in High-Dimensional Spaces—Index Structures for Improving the Performance of Multimedia Databases", ACM Computing Surveys, vol. 33, No, 3, Sep. 2001, pp. 322-373.
A. Guttman, "R-Trees: A Dynamic Index Structure for Spatial Searching", ACM, 1984, pp. 47-57.
Chakka et al., "Indexing Large Trajectory Data Sets with SETI", In online Proceedings of the 1st Biennial Conference on Innovative Data Systems Research (CIDR), 2003, 12 pages.
Dang et al., "Chapter 2—Trajectory Indexing and Retrieval", in Book "Computing with Spatial Trajectories", Springer, 2011, pp. 35-60.
Chang et al., "An Efficient Trajectory Index Structure for Moving Objects in Location-Based Services", in OTM Workshops 2005, LNCS 3762, pp. 1107-1116, 2005.
European Office Action for related European Patent Application No. 13 809 942.9-1952 dated Jan. 12, 2017, 8 pages.

* cited by examiner

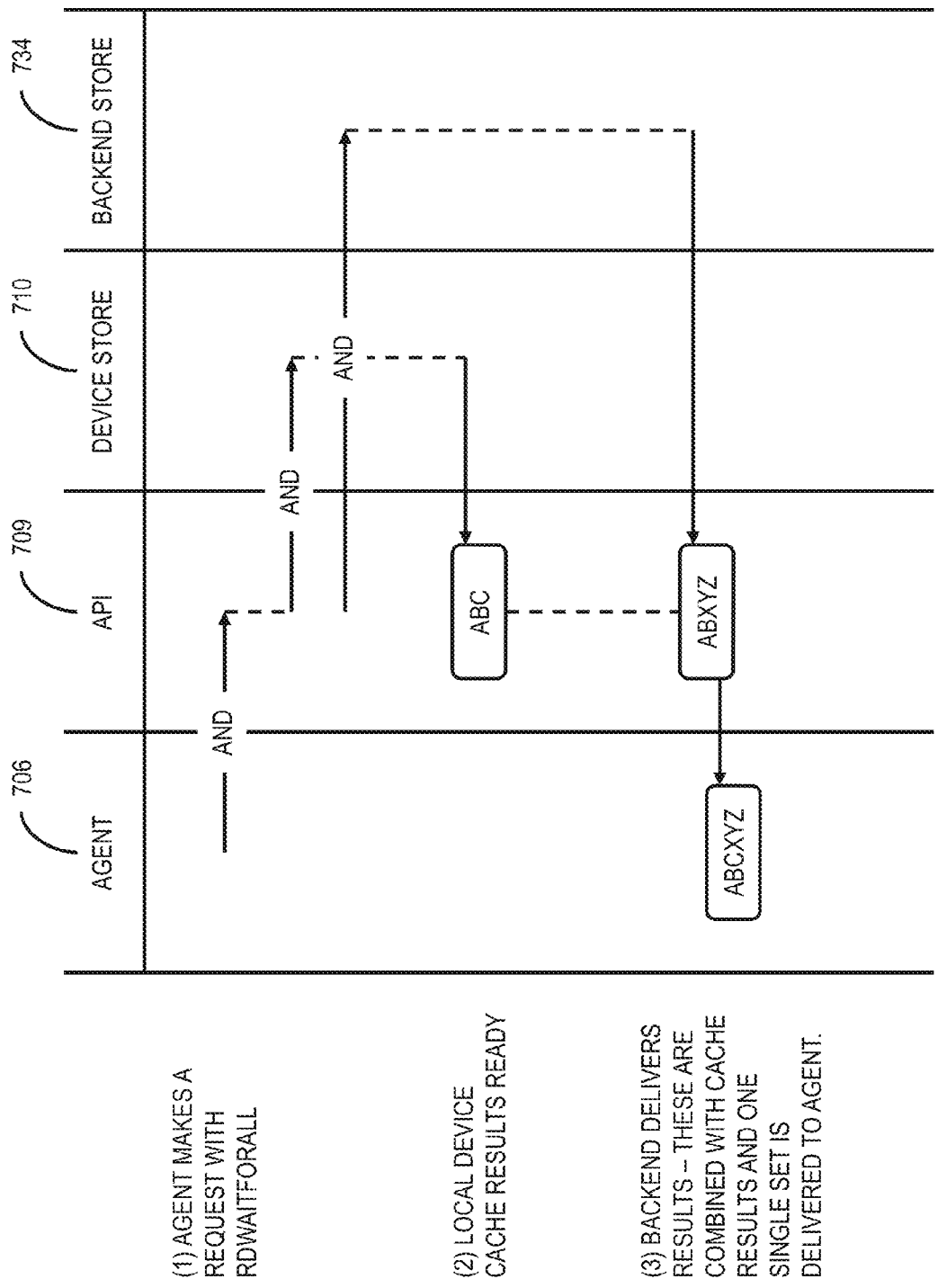

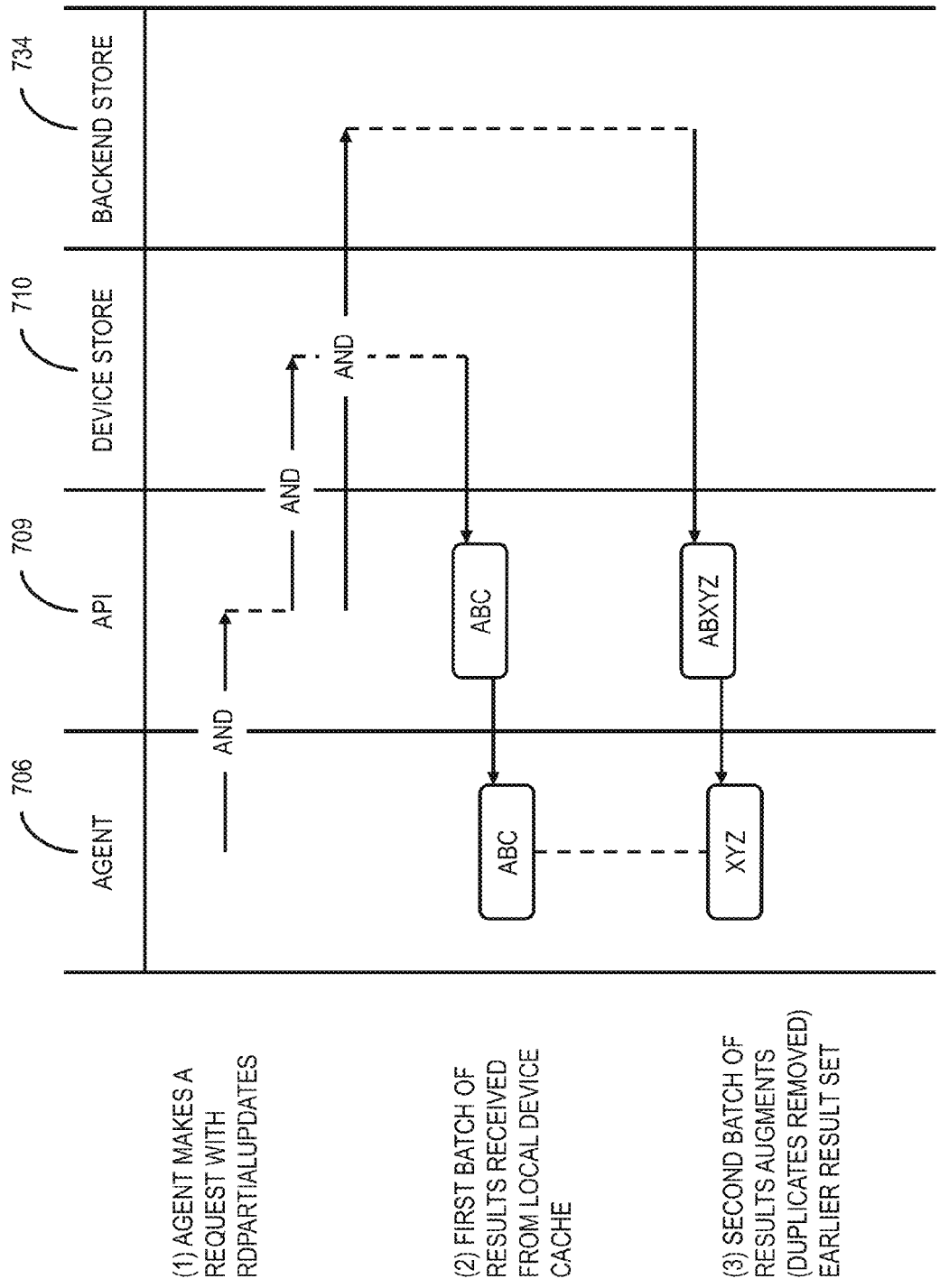

METHOD AND APPARATUS FOR MULTIDIMENSIONAL DATA STORAGE AND FILE SYSTEM WITH A DYNAMIC ORDERED TREE STRUCTURE

CROSS-REFERENCE TO RELATED APPLICATION

This application is a continuation of U.S. patent application Ser. No. 13/538,613, filed Jun. 29, 2012, entitled "Method and Apparatus for Multidimensional Data Storage and File System With A Dynamic Ordered Tree Structure" and issued into U.S. Pat. No. 8,930,374, which is incorporated herein by reference in its entirety.

BACKGROUND

Service providers and device manufacturers (e.g., wireless, cellular, etc.) are continually challenged to deliver value and convenience to consumers by, for example, providing compelling network services. One area of development has been the creation of large stores or databases of information for use or access through such services.

In addition to there being a significant increase in the number of devices in the market, internet services are leading to vast amounts of data which needs to be managed (both structured and binary) in nature. This data needs to be stored, managed, searched and analyzed. Over the last decade it has been estimated that internet services will have accumulated around 2500 exabytes of data. However, most of this data is not structured in nature; but typically needs to be stored, searched and analyzed appropriately to be useful to users in a meaningful manner in real time.

For example, a mapping service or application may rely on data stores containing millions or even trillions of data records containing information on map features such as points-of-interests, topography, terrain features, and the like. However, as the number of data records increase, service providers and device manufacturers face significant technical challenges to enabling efficient access and query of large information or data systems.

A significant technical issue for distributed storage system design typically involved efficiently accessing geographic information, such as electronic maps, and provides information back to a nomadic device for storage in an energy efficient manner. Since electronic map design typically can be based on an R-Tree implementation, storage systems nowadays are shifting to flash based devices, but there are significant challenges as to how to achieve scalable and energy efficient data translation layers within distributed systems.

SOME EXAMPLE EMBODIMENTS

Therefore, there is a need for an approach for providing one or more dynamic ordered tree structures and transition tree structures (e.g., based on one or more transitions of a device) to facilitate querying and/or accessing data stores.

According to one embodiment, a method comprises determining to generate at least one index structure, determining to associate index objects of the generated index structure with one or more data objects of at least one data store, determining to generate at least one transition index structure based on the at least one generated index structure, and determining to associate the transition index structure with index objects corresponding to one or more data objects of at least one data store based on a transition of a device. The method also comprises determining to generate at least one query for one or more data objects, and determining to generate the at least one transition index structure where a current index structure to resolve the query is absent.

According to one embodiment, a method can also comprise one or more of determining to generate one or more state trajectories for the transition index structure, determining to reduce states of the one or more state trajectories for the transition index structure, determining to observe a history of index objects for one or more generated index structures to determine the transition index structure, and determining to extract at least one pattern of index objects, at least one sequence of index objects, or a combination thereof, to determine the transition index structure.

According to another embodiment, an apparatus comprises at least one processor, and at least one memory including computer program code, the at least one memory and the computer program code configured to, with the at least one processor, cause, at least in part, the apparatus to determine to generate at least one index structure, determine to associate index objects of the generated index structure with one or more data objects of at least one data store, determine to generate at least one transition index structure based on the at least one generated index structure, and determine to associate the transition index structure with index objects corresponding to one or more data objects of at least one data store based on a transition of a device.

The apparatus is further caused to one or more of determine to generate one or more state trajectories for the transition index structure, determine to reduce states of the one or more state trajectories for the transition index structure, determine to observe a history of index objects for one or more generated index structures to determine the transition index structure, and determine to extract at least one pattern of index objects, at least one sequence of index objects, or a combination thereof, to determine the transition index structure.

According to another embodiment, a computer-readable storage medium carries one or more sequences of one or more instructions which, when executed by one or more processors, cause, at least in part, an apparatus to determine to generate at least one index structure, determine to associate index objects of the generated index structure with one or more data objects of at least one data store, determine to generate at least one transition index structure based on the at least one generated index structure, and determine to associate the transition index structure with index objects corresponding to one or more data objects of at least one data store based on a transition of a device.

According to another embodiment, a computer-readable storage medium carries one or more sequences of one or more instructions which, when executed by one or more processors, further cause, at least in part, an apparatus to determine to generate at least one query for one or more data objects, and determine to generate the at least one transition index structure where a current index structure to resolve the query is absent.

According to another embodiment, a computer-readable storage medium carries one or more sequences of one or more instructions which, when executed by one or more processors, further cause, at least in part, an apparatus to one or more of determine to generate one or more state trajectories for the transition index structure, determine to reduce states of the one or more state trajectories for the transition index structure, determine to observe a history of index objects for one or more generated index structures to determine the transition index structure, and determine to extract at least one pattern of index objects, at least one sequence of index objects, or a combination thereof, to determine the transition index structure.

According to another embodiment, an apparatus comprises means for determining to generate at least one index structure, means for determining to associate index objects of the generated index structure with one or more data objects of at least one data store, means for determining to generate at least one transition index structure based on the at least one generated index structure, and means for determining to associate the transition index structure with index objects corresponding to one or more data objects of at least one data store based on a transition of a device. The apparatus also comprises means for determining to generate at least one query for one or more data objects, and means determining to generate the at least one transition index structure where a current index structure to resolve the query is absent.

According to another embodiment, an apparatus comprises one or more of means for determining to generate one or more state trajectories for the transition index structure, means for determining to reduce states of the one or more state trajectories for the transition index structure, means for determining to observe a history of index objects for one or more generated index structures to determine the transition index structure, and means for determining to extract at least one pattern of index objects, at least one sequence of index objects, or a combination thereof, to determine the transition index structure.

According to another embodiment, a method comprises facilitating access to at least one interface configured to allow access to at least one service, the at least one service configured to determine to generate at least one index structure, determine to associate index objects of the generated index structure with one or more data objects of at least one data store, determine to generate at least one transition index structure based on the at least one generated index structure, and determine to associate the transition index structure with index objects corresponding to one or more data objects of at least one data store based on a transition of a device. The at least one service is further configured to determine to generate at least one query for one or more data objects, and determine to generate the at least one transition index structure where a current index structure to resolve the query is absent.

The at least one service is further configured to one or more of determine to generate one or more state trajectories for the transition index structure, determine to reduce states of the one or more state trajectories for the transition index structure, determine to observe a history of index objects for one or more generated index structures to determine the transition index structure, and determine to extract at least one pattern of index objects, at least one sequence of index objects, or a combination thereof, to determine the transition index structure.

According to another embodiment, a computer program product including one or more sequences of one or more instructions which, when executed by one or more processors, cause an apparatus to determine to generate at least one index structure, determine to associate index objects of the generated index structure with one or more data objects of at least one data store, determine to generate at least one transition index structure based on the at least one generated index structure, and determine to associate the transition index structure with index objects corresponding to one or more data objects of at least one data store based on a transition of a device. The apparatus is further caused to determine to generate at least one query for one or more data objects, and determine to generate the at least one transition index structure where a current index structure to resolve the query is absent.

According to another embodiment, a computer program product including one or more sequences of one or more instructions which, when executed by one or more processors, further cause an apparatus to one or more of determine to generate one or more state trajectories for the transition index structure, determine to reduce states of the one or more state trajectories for the transition index structure, determine to observe a history of index objects for one or more generated index structures to determine the transition index structure, and determine to extract at least one pattern of index objects, at least one sequence of index objects, or a combination thereof, to determine the transition index structure.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7C is a diagram of an exemplary process flow in providing search results implementing context enhancing searching using dynamic ordered tree structures, according to one embodiment;

FIG. 7D is a diagram of another exemplary process flow in providing search results implementing context enhancing searching using dynamic ordered tree structures, according to one embodiment;

DESCRIPTION OF SOME EMBODIMENTS

Examples of a method, apparatus, and computer program for providing dynamic ordered tree index structures and transition index structures, such as for enhanced context searching, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "data store" refers to one or more data structures for storing and retrieving data represented by physical phenomena. The data structure may be a single file, a file system, or a sophisticated database, such as a relational database, or any other arrangement of data. In some embodiments, the data store may be a distributed data store. By way of example, a "distributed data store" refers to multiple data structures spread over two or more nodes of a communications network, such as the Internet. To guard against node failure, entries in some distributed data stores are replicated on multiple nodes.

Figure 1:
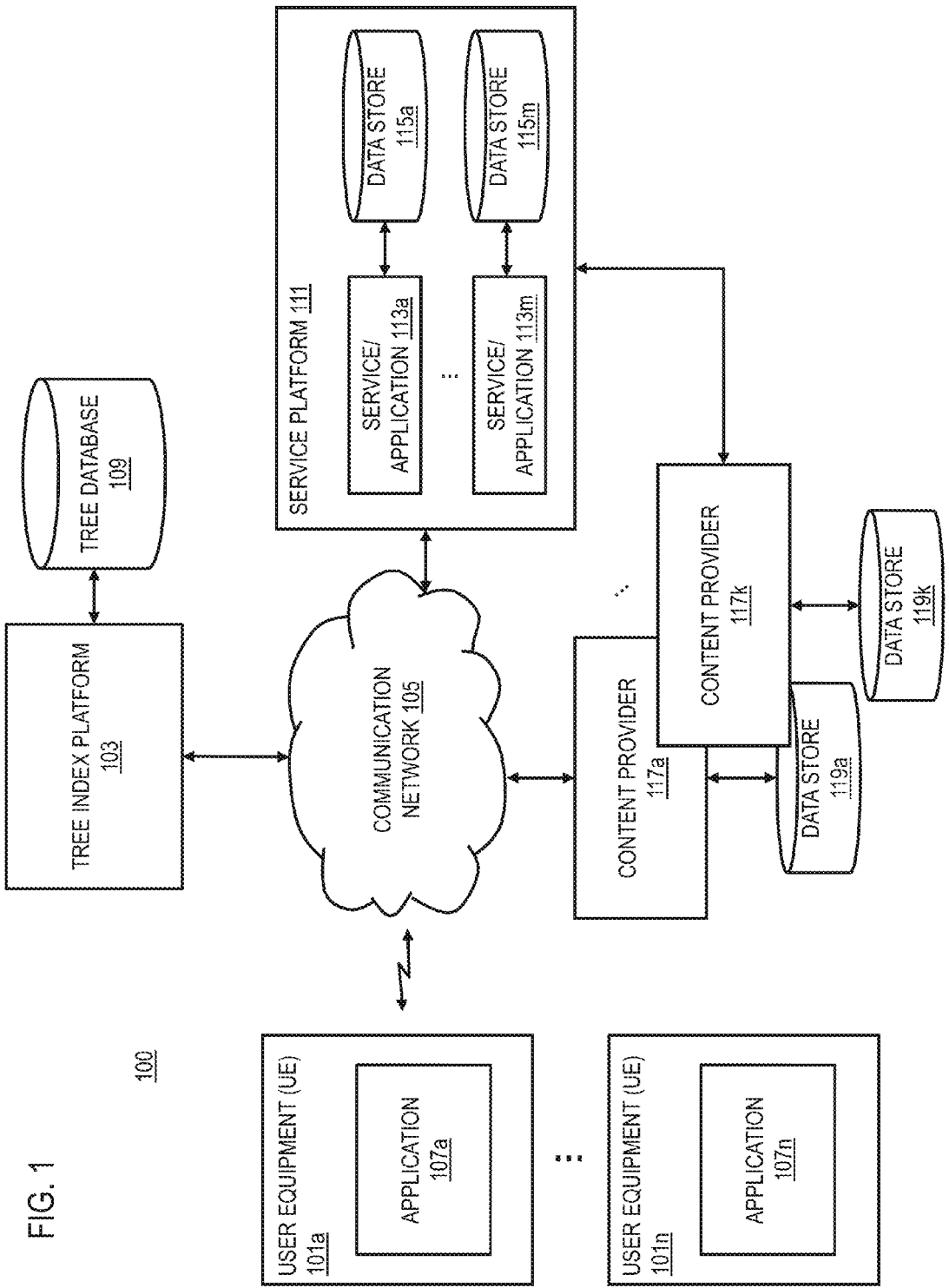
FIG. 1 is a diagram of a content delivery network system capable of implementing content enhanced searching using a dynamic ordered tree structure, according to exemplary embodiments.

FIG. 1 is a diagram of a content delivery network system capable of implementing context enhanced searching using a dynamic ordered tree structure capable of providing dynamic ordered multidimensional tree structures, according to one embodiment. As previously mentioned, modern applications and services can often include accessing and/or managing large data stores or databases with potentially vast numbers of records. However, as the sizes of these data stores increase, it becomes more resource and time intensive to query, update, or otherwise manage the records within the data stores. Traditional approaches have sought to improve operational efficiency of large data stores by using a tree structure to arrange sorted or ordered data objects. For example, the B-tree, B+ tree, and their variants are generally used to arrange sorted data (objects) in a way that allows for efficient insertion, retrieval, and/or removal of individual data records with the data stores. Typically, each of the records is identified in the tree structure by key (e.g., a unique identifier).

Another type of known tree structure is an R-tree. The R-tree is similar to a B-tree, but is used to operate on spatially related data, where the data records or objects include coordinates in an n-dimensional Euclidean space. An example of such objects is geo-tagged data that includes latitude/longitude coordinates (e.g., points of interest in a mapping service, geo-tagged images, tracking information, etc.). Under this approach, R-tree related algorithms allow for implementing different types of queries (e.g., spatial queries) with conditions specified for location coordinates.

However, these traditional tree-structure approaches and related technologies rely on the assumption that the set of all data objects in the data stores is or can be totally ordered based on one or more specific parameters. Totally ordered, in this case, refers to whether all data records in the data store include values for comparable parameters that can sorted or ordered. For example, a contact list that is arranged using a B-tree is typically sorted alphabetically before mapping the objects or records of the contact list to a B-tree. Moreover, queries and operations over traditional trees often are dependent on knowledge or viewing of the underlying objects of the data store and cannot generally be completed using the only the tree structure. Consequently, iterating over the objects of a large data store can be slowed as the objects are accessed and inspected as part of the completing a requested query or operation.

In addition, a common type of query that is often performed on the data store is a query wherein a range with respect to one or more parameters of the data objects is specified to conduct the query. For example, for a contact list, one range-based query may request all contacts whose birthdays fall between Jan. 1, 1970 and Jun. 30, 1971. Under the traditional approaches, even if the data objects can be ordered or sorted according to birthdays, the ranged query would nonetheless cause the query engine to iterate over a potentially responsive range of the data by accessing the data records and determining whether the records fall within the queried range. The accessing and inspecting of the data records can be resource and time intensive.

One known approach to supporting ranged searches is a Trie data structure used in, for instance, in Lucene. It is noted that Lucene is widely used for its full test searching and indexing capabilities. For this purpose, a Trie-based approach builds object keys from objects (e.g., most often text documents) for a predefined set of queries. For this purpose, Trie often specifies keywords and phrases that are extracted from the original data objects to build an index. Trie data structures often are based on predefined data formats, key words, searches, and ranges. However, for less structured or arbitrary data, Trie and/or Lucene typically have limited applicability.

However, such known ordered structures, do not address the efficient accessing of geographic information, such as electronic maps, and such as where the device changes location. To address this problem, the content delivery network system 100 of FIG. 1 introduces the capability to provide a dynamic multidimensional ordered tree structure for accessing and managing data stores. In one embodiment, the system 100 implements state space trajectories using, for example, an R-tree structure, to arrange, order and generate and predict an R-tree structure having points or map tiles arranged and grouped according to the state space trajectories, based upon one or more of a location of a device or user criteria, such as home, work or leisure, that can be used to construct the ordered tree structure and a corresponding query for application to the ordered tree structure to identify specific objects (e.g., data objects) of the data store.

More specifically, in one embodiment, the system 100 provides state space trajectories to define a dynamic, ordered tree structure, such as an R-tree, that is used to manage multidimensional data, such as geographical data within a computation context that includes geo-coding and reverse geo-coding, which relates to a user's current or likely status for accessing and efficiently managing data stores to efficiently provide context enhanced searching, such as over large-scale R- trees.

In this regard, a search on a large scale R-tree efficiently is very important when a system scales up. It is known that an R-tree is a height balanced tree similar to B-tree with index records in its leaf nodes containing pointers to data objects. (See, for example Guttman, A., R-Trees: a dynamic index structure for spatial searching, ACM (1984); and, for example, Bayer, R., & McCreight, E., Organization and Maintenance of Large Ordered Indexes. *Acta Informatica*, pp. 173-189 (1972)). With such trees, the index can be virtually completely dynamic; and inserts and deletes can be intermixed with searches and no periodic reorganization is typically required.

As to spatial databases and their application to exemplary embodiments, it is known, such as from Guttman (See, for example Guttman, A., R-Trees: a dynamic index structure for spatial searching, ACM (1984)) that a spatial database includes a collection of tuples representing spatial objects, and each tuple has a unique identifier which can be used to retrieve it. Leaf nodes in an R-tree contain index record entries of the form $$(I, \text{tuple} \rightarrow \text{identifier})$$

Where tuple→identifier refers to a tuple in the database and I is an n-dimensional rectangle which is the bounding box of the spatial object indexed $$I = (I_0, I_1, \ldots, I_{n-1})$$

And where n is the number of dimensions and $I_i$ is a closed bounded interval [a, b] describing the extent of the object along dimension i. Alternatively, $I_i$ can have one or both end points equal to infinity, indicating that the object extends outward indefinitely. Non-leaf nodes contain entries of the form $$(I, \text{child} \rightarrow \text{pointer})$$

where child→pointer is the address of lower node in the R-tree and I covers all rectangles in the lower node's entries.

Further, if M is defined as a maximum number of entries that will fit in one node and assuming m≤M/2 as a parameter specifying the minimum number of entries in a node the maximum number of nodes is $$\max \sum_i \left[\frac{N}{m}\right] + \left[\frac{N}{m^2}\right] + \ldots + 1$$

And the worst case utilization for all nodes except the root is m/M. Thus, the parameter m can be varied as part of performance tuning meaning that the control parameter for any wrappers can be adapted for context enhanced searching, such as based on one or more of a location dependent or context based criteria, according to exemplary embodiments.

Also, it is known that complex data structures, as well as the mechanisms of traversing/search, could benefit from semi-stochastic or stochastic approximations during the search. (See, for example, May, R., Simple Mathematical Models with very Complicated Dynamics. *Nature*, p. 459 (1975)). Thus, $I=(I_0, I_1, \ldots, I_{n-1})$ and m≤M/2 can be represented as the following state relations:

$$x(I+1) = \Phi_I[m(I), \gamma(I), m(I+1), \gamma(I+1), u(I)] \cdot k(I) + \Gamma_I[m(I), \gamma(I), m(I+1), \gamma(I+1), u(I)] \cdot w(I);$$

$$z(I+1) = H_{I+1}[m(I+1), \gamma(I+1)] G_{I+1}[m(I+1), \gamma(I+1)] \cdot v(I);$$

Where x(I)—is extended vector of state of any given R-tree or a set of those; u(I)—is a vector of requests and corresponding impacts; z(I+1)—is a requests observation vector; w(I) and v(I) are non-correlated random requests; $\Phi_I[\bullet]$, $\Gamma_2[\bullet]$, $H_{I+1}[\bullet]$ and $G_{I+1}[\bullet]$—are matrix functions of corresponding dimensions. And m(I) is a set of converging points in trajectory when any given switching can be explained with rational twisted numbers as, for example: $\gamma(I) = \{\gamma'(I), \gamma''(I)\}$.

Where $\gamma'(I)$ twisted number typically is characterized with semi-stochastic process and $\gamma''(I)$ typically is characterized with stochastic process.

Thus, according to exemplary embodiments, in view of and applying the foregoing mathematical state space relationships and mechanisms of traversing/search, the processes of trajectory construction for a context enhanced search can be converged down to the task of conditional posterior state vector estimations computation and rational twisted numbers. Also, any initial state can be approximated with a probability density function (PDF) over a conditional Gaussian distribution or with Poisson slices in each point of the state trajectory.

For example, according to exemplary embodiments, bootstrapping, as an initial state approximation in relation to a context enhanced search, the conditional posterior state vector estimations computation x(I) includes posterior likelihoods as:

$$q_I(m_I, \gamma_I) = Pr\{U_I(m_I, \gamma_I)/Z^I\}$$

of the hypothesis $U_I(m_I, \gamma_I) = \{m(I) = m_I, \gamma(I), = \gamma_I\}$, and combination of first two momentums of posterior PDFs as:

$$\hat{x}_I(m_I, \gamma_I) = M\{x(I)/Z^I, U_I(m_I, \gamma_I)\};$$

$$P_I(m_I, \gamma_I) = M\{[x(I) - \hat{x}_I(m_I, \gamma_I)][\bullet]^T/Z^I, U_I(m_I, \gamma_I)\}$$

Here and after, $[x] \cdot [\bullet]^T = [x] \cdot [x]^T$.

As such, characteristics in relation to the dynamic ordered trees, such as an R-tree, as described herein in the above and following relationships, typically are determined at every $I^{th}$ step, such as at substantially for every index or bucket of indices available in an R-tree, for example.

Thus, for exemplary embodiments, as to determination of dynamic ordered tree structures in relation to a user's or user's device current or likely status for accessing and efficiently managing data stores to efficiently provide context enhanced searching, such as based on a user's location, status or criteria, trajectory points branching, as based on the relationships herein, typically involves a determination of trajectory points branching for the dynamic ordered trees. In this regard, such branching for the dynamic ordered trees can be determined by using conditional probabilities while taking into account semi-stochastic and stochastic characteristics, such as further based on the following relations:

$$q_{I+1/I}(m_I,\gamma_I,m_{I+1},\gamma_{I+1})=Pr\{U_I(m_I,\gamma_I),U_{I+1}(m_{I+1},\gamma_{I+1})\}=q_I(m_I,\gamma_I)\cdot p_{I+1}(m_{I+1},\gamma_{I+1}/m_I,\gamma_I)\cdot p_{I+1}''(\gamma_{I+1}''/\gamma_I,m_{I+1},\gamma_{I+1}'')$$

Also, for example, the estimation relations as to determination of dynamic ordered tree structures typically can take into account the bounded hypotheses $U_I(m_I,\gamma_I)$, $U_{I+1}(m_{I+1},\gamma_{I+1})$, and the means covariance and partial $\hat{x}_I(m_I,\gamma_I)$ determination, as follows:

$$\hat{x}_{I+1/I}(m_I,\gamma_I,m_{I+1},\gamma_{I+1})=M\{x(I+1)/Z^I,U_I(m_I,\gamma_I),U_{I+1}(M_{I+1},\gamma_{I+1})\};$$

$$P_{I+1/I}(m_I,\gamma_I)=M\{[x(I+1)-\hat{x}_{I+1/I}(m_I,\gamma_I,m_{I+1},\gamma_{I+1})]\times[\bullet]^T/Z^I,U_I(m_I,\gamma_I),U_{I+1}(m_{I+1},\gamma_{I+1})\}$$

And, the estimations can be constructed, such as via a standard filter estimator, according to the above-described state relations.

Further, in the determination of the trajectory points branching for the dynamic ordered trees a hypothesis convolution into the state point typically assumes the likelihood determination by $m_I$ and $\gamma_I$, as follows:

$$q_{I+1/I}(m_{I+1},\gamma_{I+1})=Pr\{U_{I+1}(m_{I+1},\gamma_{I+1})/Z^I\}=\Sigma_{m_I,\gamma_I}q_{I+1/I}(m_I,\gamma_I,m_{I+1},\gamma_{I+1}),$$

$$q_I(m_I,\gamma_I/m_{I+1},\gamma_{I+1})=Pr\{U_I(m_I,\gamma_I)/Z^I,U_{I+1}(m_{I+1},\gamma_{I+1})\}=q_{I+1/I}(m_I,\gamma_I,\gamma_{I+1})/q_{I+1/I}(m_{I+1},\gamma_{I+1})$$

Also, in the partial estimation and covariance convolution in the determination of state space vectors in the determination of the trajectory points branching for the dynamic ordered trees, according to exemplary embodiments typically can be done by $m_I$ and $\gamma_I$ with the following relations:

$$\hat{x}_{I+1/I}(m_{I+1},\gamma_{I+1}) = M\{x(I+1)/Z^I, U_{I+1}(m_{I+1},\gamma_{I+1})\}$$

$$= \sum_{m_I,\gamma_I} q_I(m_I,\gamma_I/m_{I+1},\gamma_{I+1}) \cdot$$

$$\hat{x}_{I+1/I}(m_I,\gamma_I,m_{I+1},\gamma_{I+1}) \times$$

$$P_{I+1/I}(m_I,\gamma_I/m_{I+1},\gamma_{I+1})$$

$$= \sum_{m_I,\gamma_I} q_I(m_I,\gamma_I/m_{I+1},\gamma_{I+1})$$

$$[P_{I+1/I}(m_I,\gamma_I/m_{I+1},\gamma+1)+$$

$$[\hat{x}_{I+1/I}(m_{I+1},\gamma_{I+1})-$$

$$\hat{x}_{I+1/I}(m_I,\gamma_I,m_{I+1},\gamma_{I+1})]\cdot[\cdot]^T].$$

Therefore, according to exemplary embodiments, the estimation of state space vectors via a current index $z(I+1)$ typically can be done with filtering bootstrapping for each hypotheses $U_{I+1}(m_{I+1},\gamma_{I+1})$. As a result, the needed estimations and covariance can be typically determined for the current request $(I+1)$, such as based on a current or likely user equipment's, status, location or criteria, for example.

Also, according to exemplary embodiments, the exemplary process for determination of state space vectors in the determination of the trajectory points branching for the dynamic ordered trees can be typically accompanied with hypothesis $U_{I+1}(m_{I+1},\gamma_{I+1})$ testing versus trajectory points, such as via PDFs, which includes, for example, a posterior likelihood $q_{I+1/I}(m_{I+1},\gamma_{I+1})$ determination. Here, for "a priori" likelihoods the hypotheses trustworthiness criteria, the Gaussian densities or twisted map numbers are taken, for example, as:

$$\Pi_{I+1}(m_{I+1},\gamma_{I+1})=N\{\Delta z_{I+1}(m_{I+1},\gamma_{I+1})/0,D_{I+1}(m_{I+1},\gamma_{I+1})\},$$

Where $\Delta z_{I+1}(m_{I+1},\gamma_{I+1})$ is a computational diff, and $D_{I+1}(m_{I+1},\gamma_{I+1})$ it's covariance, determined for each pair $m_{I+1}$ and $\gamma_{I+1}$.

Finally, the actual estimation as to the determination of state space vectors in the determination of the trajectory points branching for the dynamic ordered trees is determined as:

$$y(I+1) = \arg\max_{m_{I+1}/\gamma_{I+1}}\;[q(m_{I+1},\gamma_{I+1})]$$

Therefore, according to exemplary embodiments, the exemplary algorithms and processes, as described herein, exhibit natural parallelization abilities and, as such, are thus implementable for virtually any parallel processing framework, such as can be implemented in the determination of state space vectors in the determination of the trajectory points branching for the dynamic ordered trees. Further, since in case of infinite iterations computation number is growing linearly in time (O(n)), it can optimized for finite time O(1) by withdrawn hypotheses with low or negligible importance value.

As such, according to exemplary embodiments, one or more dynamic ordered tree structures can be constructed, based on a user's current or likely status, location or criteria, and searches can be enabled to so as to potentially likely avoid traversing all R-tree structures utilizing the above relations for trajectory construction for a context enhanced search. Therefore, in accordance with exemplary embodiments, as discussed herein, various dynamic, ordered tree structures, such as R-tree structures, can be constructed based on a determination of x(I) as an extended vector of a state of any given R-tree determined by utilizing u(I)—a vector of requests and corresponding impacts, such as query requests and searching impacts of those requests, and z(I+1)—a requests observation vector, based upon the observed searching of the requests, such as to determine likely points or map tiles in the dynamic, ordered tree structure, where w(I) and v(I) are non-correlated random requests; $\phi_I[\bullet]$, $\Gamma_I[\bullet]$, $H_{I+1}[\bullet]$ and $G_{I+1}[\bullet]$—are matrix functions of corresponding dimensions related to likely semi-stochastic or stochastic approximations during the search, with m(I) being a set of converging points in trajectory, such as for a state space trajectory for determining one or more R-trees based upon a user equipment's location, status or criteria, such as for user Equipment UE 101a-n, for example.

Also, any initial state can be approximated with a probability density function (PDF) over a conditional Gaussian distribution or with Poisson slices in each point of the state trajectory. As such, according to exemplary embodiments, one or more dynamic ordered tree structures, based on a user's current status, location or criteria, can be determined whereby a search can be enabled so as to potentially likely avoid traversing all R-tree structures, advantageously providing added efficiency in the search process.

In one exemplary embodiment, for example, the system 100 can enable dynamic binding of the data objects with one or more nodes of a dynamic, ordered tree. And, as a result, one or more dynamic ordered tree structures, based on a user's current or likely status, location or criteria, a search can be enabled to so as to potentially likely avoid traversing all R-tree structures. In other words, the binding can be automatically updated as new objects are inserted, deleted, or otherwise modified based upon a context enhanced search based upon state space trajectories, such as based on one or more of a location dependent or context based criteria, according to exemplary embodiments. In addition, it is contemplated that if the ordered tree is implemented in a distributed environment, then the traversal of the ordered tree structures can be implemented with parallel branching processes or threads, for example.

In this regard, for example, it is noted that, in order to create the described functionality, a spectrum components analysis, as a certain form of a spectral forecasting process can also be applied to determine the dynamic ordered tree structures, such as based upon a user device's location, status or criteria, such as based on the above extended vector of state of any given R-tree. It is also noted that, a multiple-input multiple-output (MIMO) modeling approach can also be applied in the determination of the dynamic ordered trees as a flexible in redefinition of inputs/outputs and generalization of non-square models as a simple and robust mechanism of increasing/decreasing complexity while maintaining the system in boundaries of stable operational modes, depending upon the particular use and application for searching. Such approach can be efficiently applied for modeling an uncertain and changeable environment, such as where a user's current status, location or criteria change, for example, depending upon the particular use or application in relation to searching.

According to the targeted environment, such as based upon a user's current status, location or criteria change, a (distributed storage infrastructure with multitude of uncertainties) model can fit and describe the cases such as (1) joining node, new input AND output synthesis (AND because while online, a node can behave as input and output), (2) leaving node, input OR output removal (OR because the moment of removal can identify only one of the possible type, input or output) wherein two sub-cases can be recognized as (2a) voluntary leaving process (this defines correct and in-order de-registration and any link/pointer removal process from the routing table), from the MIMO model perspectives it means a controllable pole which is moving towards the boundary of the stability area; thus can be observed and potential result predicted, and (2b) non-voluntary leaving process (this defines any type of failure, it means incorrect and out-of-order leaving, including omitting any de-registration process). (3) update node, no input/output related topology activity (by definition should provide mechanism of stability status update), and (4) node under normal operation.

R-tree is typically implemented as non-memory resident index structures for the access of a large collection of spatial data. In case of HDDs R-tree (FIG. 3) nodes are usually grouped into a contiguous sectors for the efficient reads and writes. However, it is not the case with flash based storage devices. Moreover, with any new types of memory implemented for the distributed storage use it is unclear how to tackle above mentioned issues.

As shown in FIG. 1, the content delivery network system 100 in applying and generating the state space trajectories and dynamic, ordered tree structures, such as R-trees, for a context enhanced search, according to exemplary embodiments, includes a user equipment (UE) 101 or multiple UEs 101a-101n (or UEs 101) having connectivity to a tree index platform 103 via a communication network 105. A UE 101 can include or have access to an application 107 (or applications 107a-n), which consist of client programs, services, or the like that can utilize the system 100 to provide, manage, and/or access the functions of the tree index platform 103. As users access the applications 107 on their respective UEs 101, the tree index platform 103 can process information related to generating ordered trees for storage in the tree database 109. As shown, the UEs 101 and the tree index platform 103 also have connectivity to a service platform 111 hosting one or more respective services/applications 113a-113m (also collectively referred to as services/applications 113) and their corresponding data stores 115a-115m (also collectively referred to as data stores 115). The UEs 101 and the tree index platform 103 also have connectivity to content providers 117a-115k (also collectively referred to as content providers 117) and their corresponding data stores 119a-119k (also collectively referred to as data stores 119). In one embodiment, the services/applications 113a-113m include the server-side components corresponding to the applications 107a-107n operating within the UEs 101. In one embodiment, the service platform 111, the services/applications 113a-113m, the applications 107a-107n, or a combination thereof have access to, provide, deliver, etc. one or more items associated with the content providers 117a-117k and their data stores 119a-119k. In other words, content and/or items are delivered from the content providers 117a-117k to the applications 107a-107n or the UEs 101 through the service platform 111 and/or the services/applications 113a-113n.

In some cases, a developer of the services/applications 113a-113m and/or the applications 107a-107n can request that the tree index platform 103 generate one or more tree index structures associated with all or a portion of any of the data stores 115 and the data stores 119 with respect to content or items obtained from the content providers 117a-117k. In one embodiment, the tree index structures can be used to support processing queries directed at any of the data stores 115 and/or 119. The developer can, for instance, transmit the request on behalf of the application 107 and/or the services/applications 113 to the tree index platform 103 for the purpose of defining data types for creating the objects and/or queries to create the tree index structures and binding the structures to the respective data stores 115 and/or 119. In one embodiment, the tree index structures can be stored in the tree database 109. In addition or alternatively, the tree index structures can be stored in the corresponding data stores 115 and/or 119 or other component of the communication network 105. After generating the tree index structures, the tree index platform 103 can receive or act on requests for performing a ranged query on the data stores 115 and/or 119.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network can be, for example, a cellular network and can employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the tree index platform 103, and the applications 107, the service platform 111, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the applications 107 and the corresponding service platform 111, services 113a-113m, the content providers 117a-117k, or a combination thereof interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
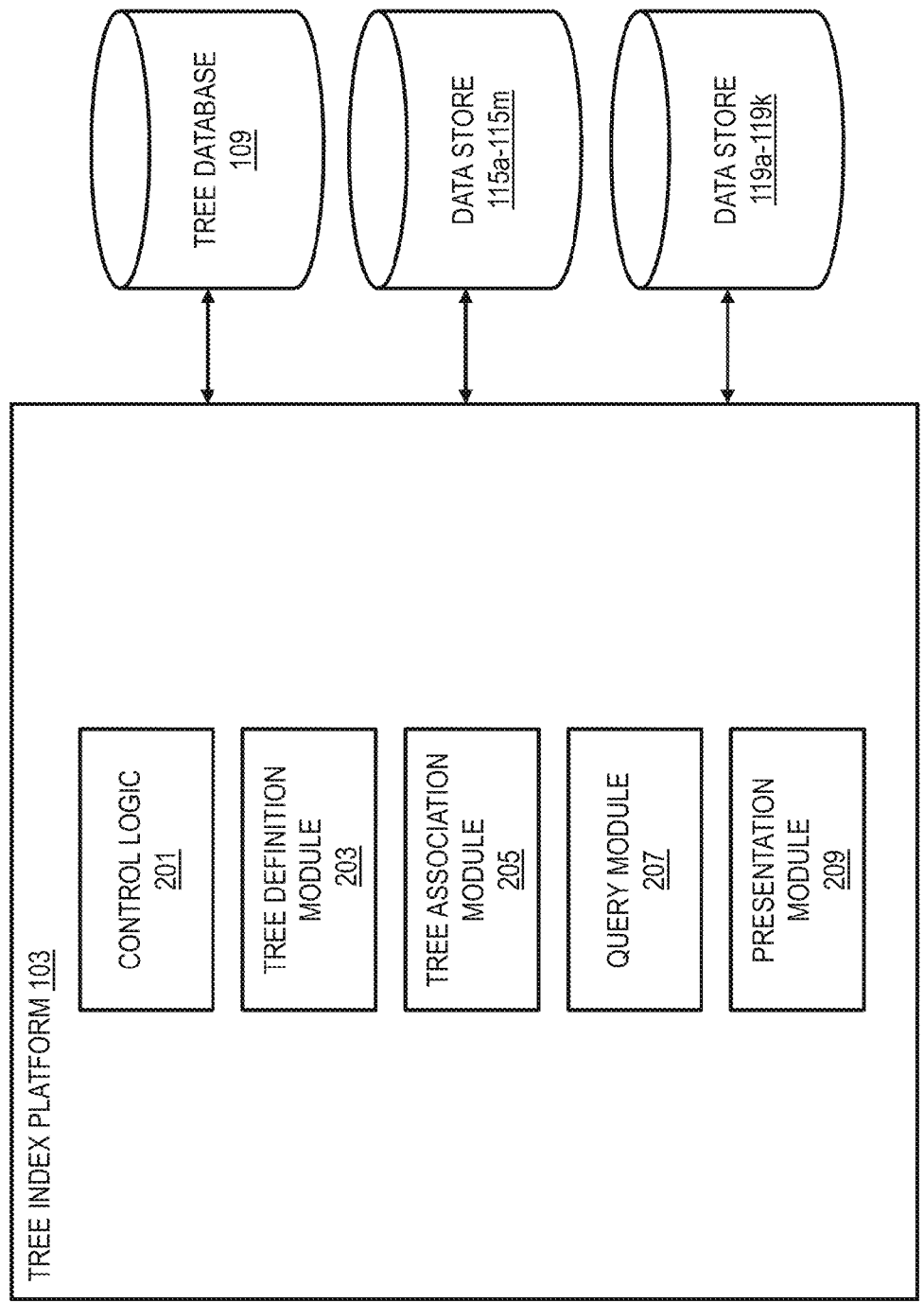
FIG. 2 is a diagram of the components of a tree index platform for implementing and providing a dynamic ordered tree structure, according to exemplary embodiments.

FIG. 2 is a diagram of the components of an exemplary platform for providing and implementing dynamic ordered tree structures for access to multidimensional data from a number of run-time environment state trajectories based on one or more of a user's current or likely status, geographical location, or user criteria, such as categories of various types or categories of trajectories, according to one embodiment, for example. By way of example, the tree index platform 103 includes one or more components for providing a dynamic ordered tree structure. It is contemplated that the functions of these components can be combined in one or more components or performed by other components of equivalent functionality.

In this embodiment, the tree index platform 103 can include at least a control logic 201 which executes at least one algorithm for performing functions of the tree index platform 103. For example, the control logic 201 interacts with a tree definition module 203 to define, configure, and/or generate one or more ordered tree structures (e.g., an index structures) for one or more data stores 115 and/or 119, such as based on one or more of a user's current status or location or user criteria, such as categories of trajectories, such as home, work or leisure, for example. In one embodiment, the tree definition module 203 determines the criteria to associate with index objects or nodes of the index structure, the number levels of the index structure, the data object parameters to include, and the like.

In one embodiment, the index objects or nodes are ordered by parameter, such as user status, location or criteria. In other words, the index structure itself is dynamically ordered based on such location, status or criteria. In this way, the data objects in the data store need not be totally ordered and can include non-comparable parameters (e.g., device model, device capabilities, color, etc.). In one embodiment, the tree definition module 203 can store the dynamic index structure in the tree database 109, as well as on a user device, such as UE 101a-n, or on a server associated with a user device, such as a server of a content delivery network. Additionally the tree definition module 203 can also be located on a user device, such as UE 101a-n, or on one or more servers of a content delivery network.

After defining or creating the index structure, the control logic 201 interacts with the tree association module 205 and the tree definition module 203 to define, configure, and/or to enable the tree association module 205 to generate one or more dynamic ordered tree structures (e.g., an index structures) to bind or otherwise associate data objects with the corresponding index objects of the index structure, such as based on a user equipment, such as UE 101a-n, current or likely location, status or criteria, according to exemplary embodiments. In an exemplary embodiment, the binding can occur, such as by linking one or more points, or map tiles, with the corresponding buckets of one or more dynamic ordered tree structures, such as in a computation context that can include geo-coding or reverse geo-coding, such as related to a user's current or likely status, location or criteria, for example.

In one embodiment, the tree index platform 103 also includes a query module 207 for performing queries in association with the control logic 201 and the tree association module 205 over the data stores via an associated ordered tree structure (e.g., an index structure). The query module 207 issues a search request to core servers or servers on content delivery network. The search request is enhanced with the categories or buckets of the dynamic ordered tree structure. And, as a result, of the one or more dynamic ordered tree structures, based on a user's current or likely status, location or criteria, the search can be enabled to so as to potentially likely avoid traversing all R-tree structures, but directed to place the search results more efficiently. By way of example, the query module 207 includes at least in part algorithms for describing and implementing the queries on objects with a combination of comparable scalar parameters and the comparable parameters data stores. On completing a query, the query module 207 can interact with a presentation module 209 to present the search results (e.g., responsive data objects from the data store) in a user interface of a user device, such as UE 101a-n.

Figure 3:
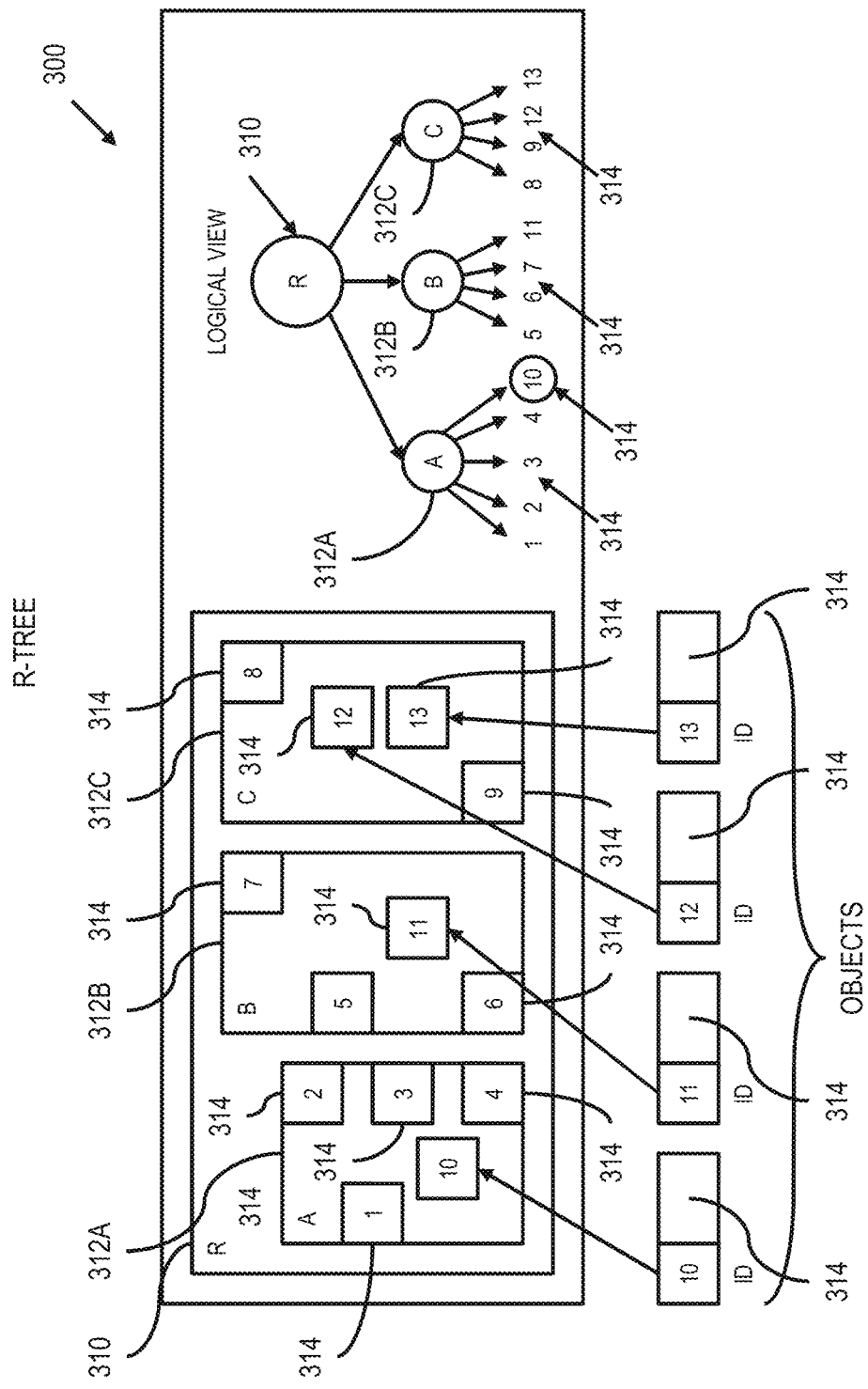
FIG. 3 is an exemplary diagram of a logical view and layout of an R-tree, as an example of a dynamic ordered tree structure, according to one embodiment.

FIG. 3 is an exemplary diagram of a logical view and layout of an R-tree, as an example of a dynamic ordered tree structure as can be implemented in the content delivery network system 100 of FIG. 1 and the tree index platform 103 of FIG. 2, according to one embodiment.

FIG. 3 illustrates an exemplary R-tree structure 300 in a bounding box layout view and in a logical view. The R-tree 310 includes a plurality of bounding boxes 312A, 312B and 312C, for example. The bounding boxes 312A-C can represent various locations, status, or criteria, such as countries or regions, e.g. Finland, Sweden and Denmark, collocated to each other. And each bounding box 312A-C, is typically bounded with a number of boxes or objects 314, such as map tiles corresponding to map features such as points-of-interests, topography, terrain features, and the like, although the boxes or objects 314 should not be construed in a limiting sense and can encompass other types of objects or representations, for example. The objects 314, such as the objects numbered 1-13, such as map tiles, for example, in the bounding boxes 312A-C are what are addressed when resolving a query, such as being requested by a user from a user equipment 101a-n in the content delivery network system 100.

The R-Tree 300 structure illustrates an example of a connection and layout of an R-tree 310 as an example of a dynamic ordered tree structure for enhanced context searching, according to exemplary embodiments. Also, the R-tree 300 structure illustrates how actual objects, such as the map tiles as objects 314, could be located within the bounding boxes 312A-C of the R-tree 310, such as based upon location, status or other user or provider criteria, and how the query actions from the user equipment 101a-n typically can proceed from a logical perspective. Using and applying state trajectories to the dynamic ordered tree structures, according to exemplary embodiments, promotes enhancing, streamlining and simplifying context searching as can be represented by a recent or current state trajectory for an R-tree, such as R-tree 300, that can be utilized to define a finite set of possible future states in R-tree indexes for a projection of a dynamic ordered tree structure, such as an R-tree structure, based upon a current or likely status, location or criteria, for example.

Figure 4:
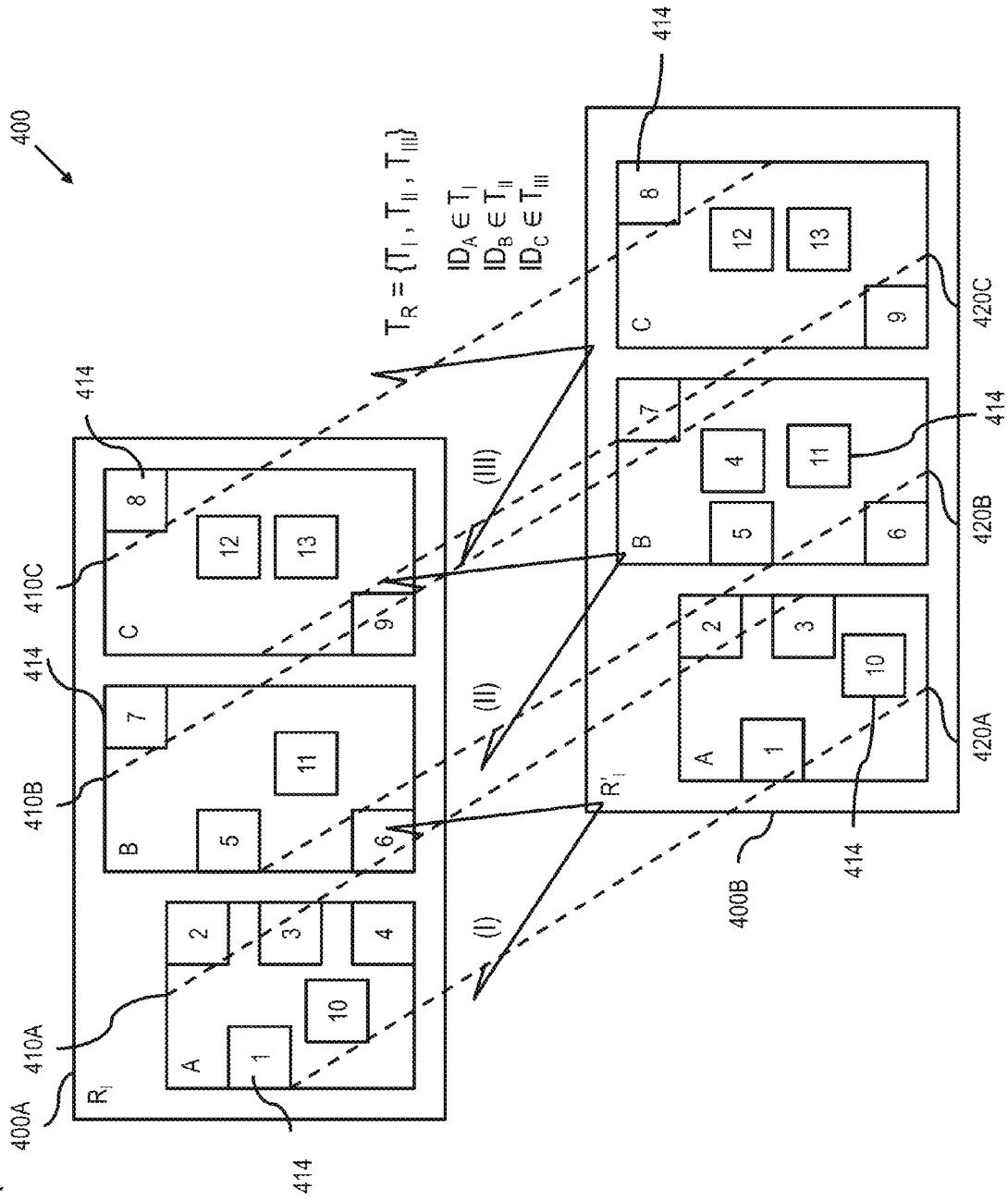
FIG. 4 is an exemplary diagram illustrating state trajectories in traversing from a first R-tree to a second R-tree as dynamic ordered tree structures, according to one embodiment.

FIG. 4 is an exemplary diagram illustrating state trajectories in traversing from a first R-tree to a second R-tree as dynamic ordered tree structures, according to exemplary embodiments, using a current state trajectory for an R-tree to define a finite set of possible future states in R-tree indexes for a projection of a dynamic ordered tree structure, such as an R-tree structure, based upon a current or likely location, status, or user or provider criteria, for example.

In FIG. 4 the exemplary diagram 400 illustrates a triggering transition and states traversing from a current state trajectory, such as for dynamic ordered tree structure 400A, identified therein as R-tree $R_1$, to a projected or likely dynamic ordered tree structure 400 B, identified therein as R-tree $R'_1$ to define a finite set of possible future states in R-tree indexes for a projection of a dynamic ordered tree structure for one or more transition index structures, by applying the algorithms and relations to generate the state trajectories, as discussed herein. The arrows (I), (II) and (III) represent the states traversal in proceeding from the state trajectory for the R-tree 400A to an anticipated likely or future state trajectory for the R-tree 400B based upon a triggering transition, such as based on a current or likely location, status, or user or provider criteria. Also, in FIG. 4, in the relation $T_R = \{T_I \cdot T_{II} \cdot T_{III}\}$, $T_R$ corresponds to the R-tree structure and $T_I$, $T_{II}$ and $T_{III}$ correspond to collections of corresponding points, or map tiles, for buckets of the R-tree structure, for example. The process in traversing from the R-Tree 400A to the R-Tree 400B, such as indicated by the arrows (I), (II) and (III), involve details and determinations, such as by use of the described algorithms or relations, related to a determination of the state trajectories and then as to the triggering transition, anticipating which points are likely needed in the resulting, projected R-tree leaf, such as for the R-Tree 400B, based upon a current or likely location, status, or user or provider criteria, for example.

The diagram structure 400 of FIG. 4 illustrates the exemplary R-trees 400A and 400B in a bounding box layout, similar to that shown in FIG. 3. The R-tree 400A, which represents an exemplary current state trajectory, similar to the R-tree includes a plurality of bounding boxes 410A, 410B and 410C, for example. The R-tree 400B includes the bounding boxes 420A, 420B and 420C, for example. The bounding boxes 410A-C and 420A-C can represent various locations, status, or criteria, such as countries or regions, e.g. Finland, Sweden and Denmark, collocated to each other, for example. And each bounding box 410A-C and 420A-C, is typically bounded with a number of boxes or objects 414, such as map tiles corresponding to map features such as points-of-interests, topography, terrain features, and the like, although the boxes or objects 414 should not be construed in a limiting sense and can encompass other types of objects or representations, for example. The exemplary objects 414, numbered 1-13 in the R-trees 400A and 400B are similar to exemplary objects 314 of FIG. 3, numbered 1-13, such as map tiles, for example, in the bounding boxes 312A-C are what are addressed when resolving a query, such as being requested by a user from a user equipment 101a-n in the content delivery network system 100.

Therefore, the diagram structure 400 with the R-trees 400A and 400B illustrates an exemplary connection and layout of R-trees as an example of a dynamic ordered tree structures for enhanced context searching by generating one or more transition index structures, according to exemplary embodiments. Also, the R-trees 300, 400A and 400B structures illustrates how actual objects, such as the map tiles as objects 314 and 414, could be located within the bounding boxes 312-A-C of the R-tree 300, or within bounding boxes 410A-C or 420A-C of R-trees 400A and 400B, such as based upon location, status or other user or provider criteria, and how the query actions from the user equipment 101a-n typically can proceed from a logical perspective. Using and applying state trajectories to the dynamic ordered tree structures as illustrated in the diagram structure 400, according to exemplary embodiments, there is illustrated how the indices can be packed into the process states, basically the states within the trajectories, and then how they could actually be managed within certain states space, according to exemplary embodiments.

For example, referring to FIG. 4, in proceeding with a context enhanced search, according to exemplary embodiments, the initial R-tree, such as R-tree 400A, can reflect a current status, location or criteria. A user would then initiate queries from a client device, such as user equipment 101a-n, that is in a current status, location or criteria. Applying the described relations and algorithms, an evaluation of the state trajectories of that client device is performed to determine potential points, such as map tiles, that likely are needed for resolution of the query or queries.

In a current R-tree index, such as for R-Tree 400A, for example, in the bounding box 410A, are points 414, such a map tiles, numbered 1, 2, 3, 4 and 10, in the bounding box 410B are points, such a map tiles, numbered 5, 6, 7 and 11 and in the bounding box 410C are points, such a map tiles, numbered 8, 9, 12 and 13. However, based on the current state trajectory, as, for example, for a business trip, certain map tiles, or certain map tiles at a particular quality or resolution, can be needed which can have a same, similar or different status, location or criteria. Applying the transition to status, location or criteria, such as for a business trip, a transition of the state trajectories would be triggered, such as from a state trajectory for the R-tree 400A to a projected state trajectory for the R-tree 400B for a transition index structure, with a query created based on projected or anticipated map tile needs, such as for the business trip or for various categories or criteria, such as for home, leisure or work, to provide a projected state trajectory including likely points 414, such as map tiles, to be located in the various bounding boxes 420A-C of the projected transition R-tree 400B for resolving the query or queries.

As illustrated in FIG. 4, applying the transition of the state trajectories, the projected state trajectory of a dynamic ordered tree structure, such as R-tree 400B, based upon the transition status, location or criteria, has located in the bounding box 420A, points 414, such a map tiles, numbered 1, 2, 3 and 10, with numbered point 4 originally in bounding box 410A being moved to the bounding box 420B, with bounding box 420B now including the points 414, such a map tiles, 4, 5, 6, 7 and 11, and in the bounding box 420C, are points 414, such a map tiles, 8, 9, 12 and 13, the points 414 in bounding box 420C remaining the same as in bounding box 410C. And the arrows (I), (II) and (III) in going from the R-trees 400A to 400B illustrate a transition of the trajectories for the projected states of the points 414, such as map tiles, likely needed for a particular category of trajectory, such as home, leisure or work, based on a transition of a status, location or criteria, for example.

Therefore, applying state trajectories to transition dynamically ordered tree structures having likely points to resolve queries based upon a transition or changed location, status, or user or provider criteria, according to exemplary embodiments, promotes enhancing, streamlining and simplifying context searching, as can be represented by a recent or current state trajectory or trajectories for dynamic ordered tree structures, such as for R-trees. And without applying such state trajectory transition or transitions, a user, in resolving a query, would typically look through and evaluate the current points, such as map tiles. Where a user concludes the evaluated points, such as map tiles, do not meet a user's requirements as to likely needed points, such as map tiles, the user would then issue another query or queries to find another branch or to another index that would have the desired information, in order to collect information to resolve the query, which can affect the efficiency and economy of a search in query resolution.

In determining a transition of state trajectories for dynamic ordered tree structures, such as in transitioning from R-tree 400A to R-tree 400B, according to exemplary embodiments, a query coming to be resolved against the data stored in a data store or other storage, such as located in the content delivery network system 100, is decomposed by data and computations associated or encapsulated within the tree structure. The traversing process for the state trajectories, such as going from R-tree 400A to R-tree 400B, can include observation of the sequences of a recent or a most recent state trajectory, such as by one or more of a user equipment 101a-n or the tree index platform 103, for example. The state trajectory typically can define a finite set of possible future states in R-tree indexes and respective fan-outs at one or more given points in the near or nearest future. And the determined knowledge of such possible future states can be leveraged in controlling the system management and determining the optimal working parameters for the system in relation to the transition state trajectories for the enhanced context searching, according to exemplary embodiments. Also, according to exemplary embodiments, a set of possible future states can be further reduced by observing the history of any given spatial object within the R-tree structure and extracting a pattern or patterns in their sequences, such as in relation to determining the transition state trajectories from R-tree 400A to R-tree 400B, for example.

From the data allocation and management point of view, according to exemplary embodiments, the transformation that typically would be necessary in order to translate the R-tree state into any potential future form, or elaborate some new form for the current needs, advantageously can be typically relatively seamlessly provided as a native feature of such prediction mechanism, such as by applying the described algorithms and relations. As such, from a dynamic ordered tree structure management perspective, such as from an R-tree graph management point of view, a number of R-tree graph information states, such as working conditions, can typically be determined as to the transition state trajectories for the R-tree structures. Such states can include, for example, duplication estimation, rebalancing forecasting, usage pattern(s) and workload estimation, among others.

Also, according to exemplary embodiments, the implementation of the transitional state trajectories typically can involve multidimensional traversing with a distribution mechanism and buckets, or storage spaces or storages areas, of R-Tree indexes. The storage areas, or buckets, of the R-tree indexes can be maintained in one or more memory areas, such as a non-volatile execution memory area, such as can be located in a convergence buffer, as can be provided by one or more of the user equipment 101*a-n* or the tree index platform 103 or other storage areas of the content delivery network system 100. Such storage areas, or buckets, of the R-tree indexes can provide and promote a synergistic storage solution, according to exemplary embodiments, enabling an energy efficient and a scalable access to multidimensional data from a number of run-time environment state trajectories, the run-time environment states typically being represented as a number of points within the trajectory, to enhance context searching.

Additionally, according to exemplary embodiments, in transitioning state trajectories, a fraction of a trajectory can be sliced and replicated or distributed with redundancy to any other shared memory node, since points in a trajectory can be represented as a snapshot of a data and a respective computation or determination. Further, according to exemplary embodiments, a relatively instant transition between the states can be typically achieved in view of a typically non-linear relationship between points in the state trajectories. And, according to exemplary embodiments, a transition of state trajectories, such as illustrated in the transition state trajectories in the R-tree 400A to the R-tree 400B of FIG. 4 can be triggered by changes of any selected properties of multidimensional data stored in an R-tree and synced with an R-tree traversing mechanism, such as by implementation of the described algorithms and relations, such as to generate one or more transition index structures.

The indexes for the dynamic ordered tree structures, such as R-tree indexes, Such as indexes for R-trees 400A and 400B typically are maintained separately from the content over which the indexes operate, such as being maintained in one or more of the tree index platform 103, user equipment 101*a-n* or other storage in the content delivery network system 100, for example.

Also, while context enhanced searching, such as implemented by state trajectories of dynamic ordered tree structures, while involving routing, such as in transmitting queries and responses to queries, is typically not routing per se. According to exemplary embodiments, context enhanced searching involves state trajectories relating to treatment of groups of points, such as map tiles, or indices and the umbrella of points within trajectories of dynamic ordered tree structures, such as R-trees, such as developed in conjunction with the described algorithms and relations, to enable facilitating service of the queries behind the routing request in a more efficient, simpler and faster way.

The context enhanced searching, implemented by the state trajectories of dynamic ordered tree structures, such as R trees 400A and 400B, according to exemplary embodiments, can facilitate minimizing misalignment within the content delivery network of the actual data and reduce the likelihood of potentially incorrect search results, such as can occur by changing the resolution of the map tiles, as for example, where a node no longer applies to a particular picture stored at a location in the content delivery network that would be associated with that particular node. In this regard, implementing the dynamic ordered tree structures, such as R-trees 400A and 400B, can address potential misalignment by dynamically changing the tree structure, such as the R-tree structure, as the resolution changes to maintain a number or size for each leaf or node, such as changing or replacing a leaf or node of the tree by creating a new index to make the potential data for resolution of queries accessible.

According to exemplary embodiments, the state of each tree, such as R-trees 400A and 400B, can be represented as a number of points within the state space trajectory. Therefore, in that each point, such as points 414 in the bounding boxes 410A-C and 420A-C are basically within the state space trajectory, navigation and jumping between different points can be facilitated, thereby simplifying navigation for the R-tree, such as in query resolution, for example. In contrast to traversing an R-tree, such as by looking at a location and determine which bounding box applies to node(s) within a desired location, according to exemplary embodiments, state trajectories of dynamic ordered tree structures, such as R-Trees 400A and 400B, are created where, based on the locations are possible points in the trajectory, a prediction can be made as to the next point location and then bind that location to a particular node in a tree to facilitate jumping directly to the desired point location without having to traverse through an entire branch of the tree.

Figure 5A:
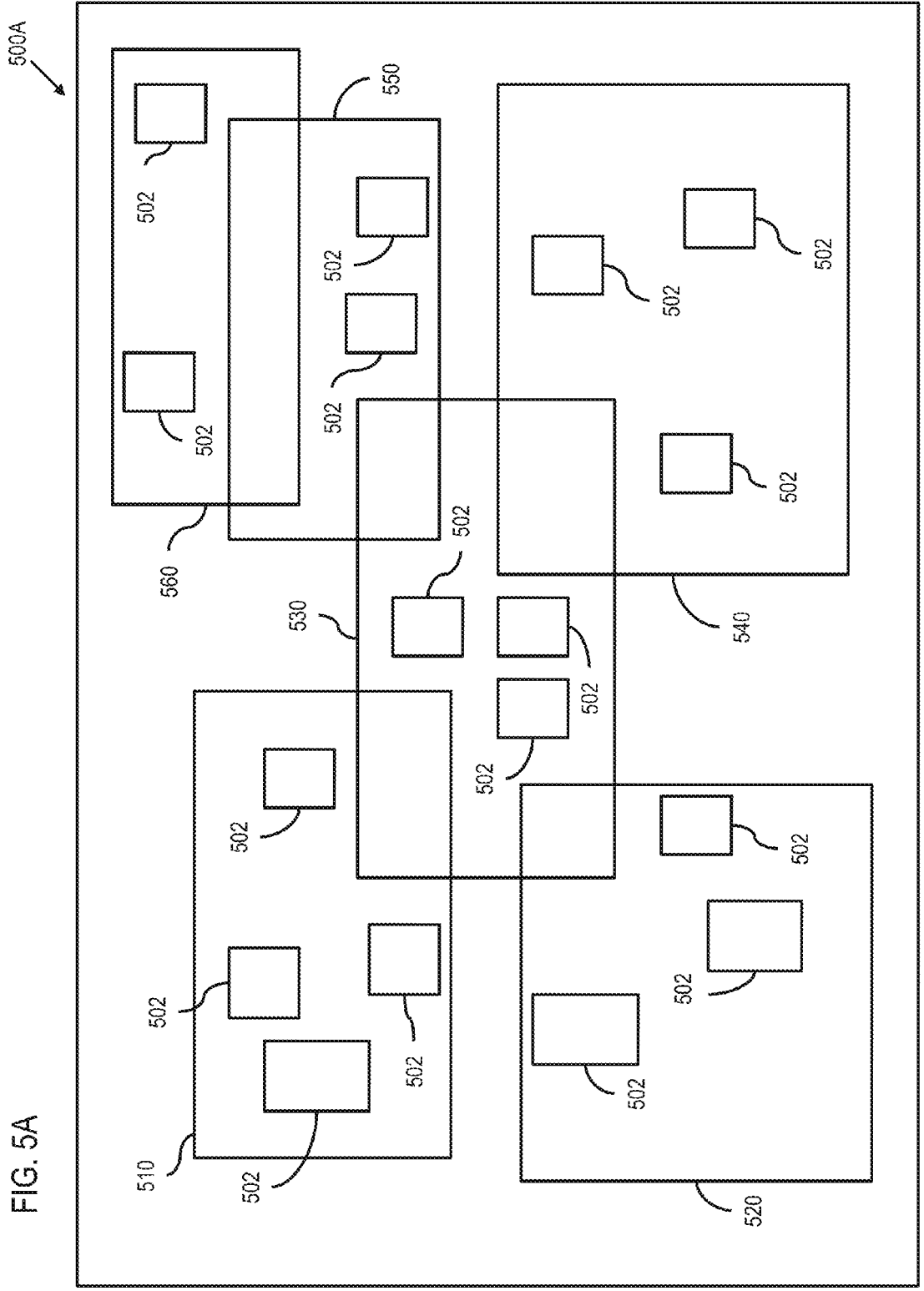
FIG. 5A is an exemplary diagram of a context map and related objects for implementing a dynamic ordered tree structure, according to one embodiment.
Figure 5B:
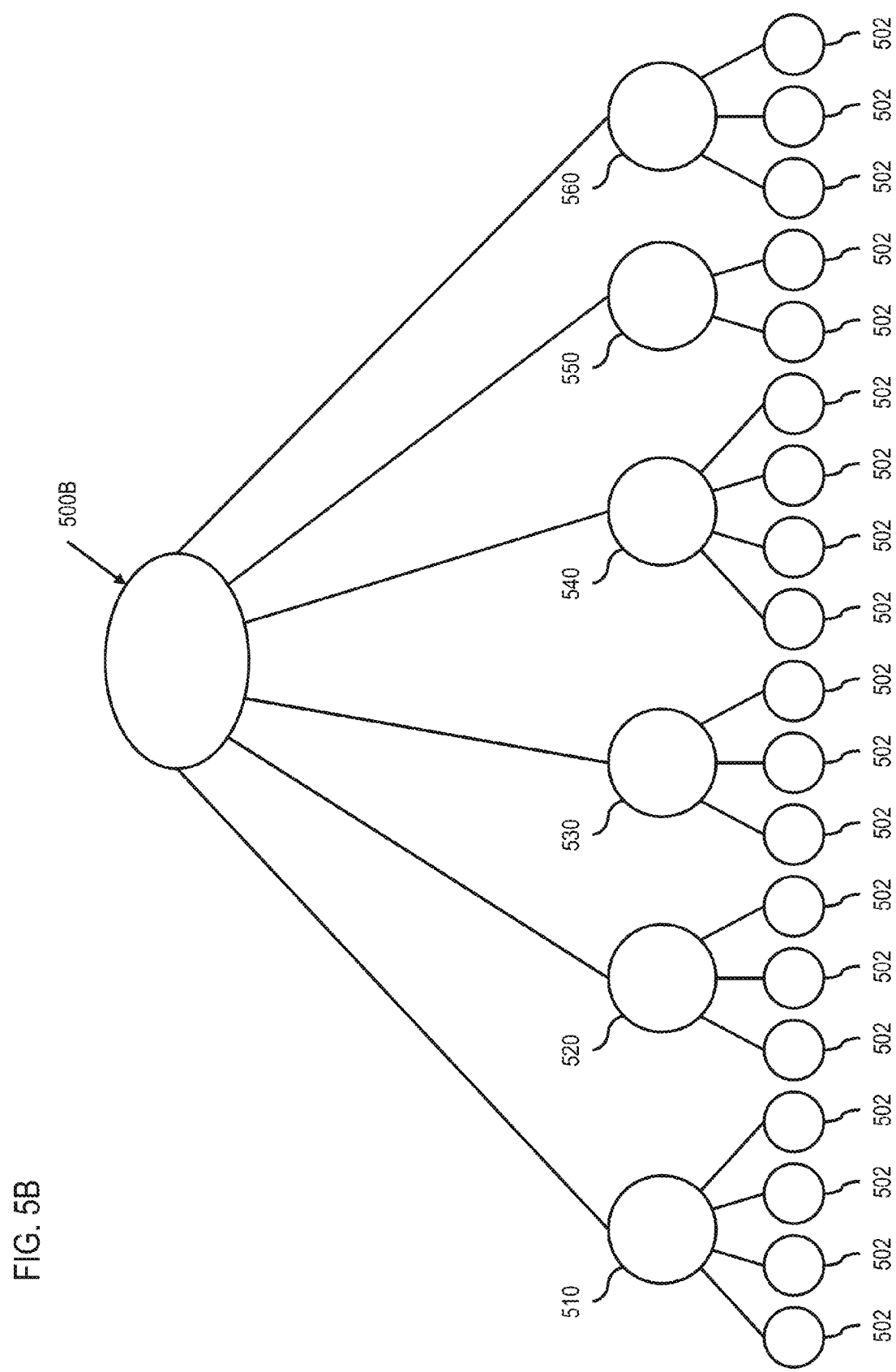
FIG. 5B is an exemplary dynamic ordered tree structure implemented from a context map and related objects, according to one embodiment.

FIG. 5A is an exemplary diagram of a context map and related objects for implementing a dynamic ordered tree structure, according to an embodiment. And FIG. 5B is an exemplary dynamic ordered tree structure as implemented from the context map and related objects of FIG. 5A, according to an embodiment. The exemplary context map 500A includes a plurality of bounding boxes 510, 520, 530, 540, 550 and 560, such as can represent a number of countries or regions, with a plurality of objects 502, such as map tiles within each of the bounding boxes 510-560. The context map 500A can, for example, be represented by the dynamic ordered tree structure, such as the R-tree 500B of FIG. 5B, as can be applied to enhanced context searching, according to exemplary embodiments. The bounding boxes 510-560, such as countries or regions, can correspond to nodes or exemplary branches of the R-tree 500B, and the corresponding leaves for the bounding boxes can correspond to the objects 502, such as map tiles, with the R-tree 500 B representing a user's, or user equipment's 110*a-n*, current or likely status, location or criteria, such as when a user changes locations or changes interests such as home, work or leisure, for example.

Even though based on a user's current or likely status, location or criteria, a relatively proper alignment order for the objects 502, such as map tiles, can have issues occur in realignment, such as while the user or customer is changing locations, as moving from one country to another, or changing criteria or status, such as home, work or leisure, for example. Also, as to the points 502 within the bounding boxes 510-560, in implementing the state trajectories for the dynamic ordered tree structures, such as R-tree structure 500B, in resolving queries, such as in moving from country to country, resolving the queries can typically involve direct coding and reverse coding related to the state trajectories for the trees, according to exemplary embodiments, such as in looking for a trajectory that describes a number of points over the indices within an R-tree, for example.

Also, overlaps or commonality of certain nodes or leaves can occur, as indicated by the overlapping of the bounding boxes, 510-560, in the context map 500A of FIG. 5A. In view of such overlap, parsing of additional branches can be performed as to determining another bounding box or other bounding boxes, for example. Also, although a number of indices can be present for each leaf of the dynamic ordered tree structure, such as for the points 502 in the bounding boxes 510-560 or in the R-tree structure 500B, as illustrated in FIGS. 5A and 5B, considering the amount of the data and the amount of the map tiles that can be created, it is possible that the resolution and the quality of the map tiles can vary or change. In this regard, applying the dynamic ordered tree structures and traversing of state trajectories, according to exemplary embodiments, can enhance and promote the eventual latency being constrained within relatively acceptable limits.

According to exemplary embodiments, applying a state space type approach for traversing over the leaves within a dynamic ordered tree structure, such as an R-tree, according to exemplary embodiments, can enhance and facilitate the ease and speed of navigation between bounding boxes, such as bounding boxes 510-560 of FIG. 5A, or in traversing from bounding boxes 410A-C to 420 A-C of FIG. 4, such as in relation to context enhanced searching. Also, according to exemplary embodiments, the presentation of state space relations and state trajectories as to a current, probable or likely location, status or criteria can be enhanced and simplified for ease of use by a user of context enhanced searching, such as by observation of the history of spatial objects, such as map tiles, over the state space trajectories, for example. Further, according to exemplary embodiments, observing the history of spatial objects, such as based upon status, location or criteria, for context enhanced searching, can be enhanced such as by caching buckets of the dynamic ordered tree structures into memory, such as a flash memory on one or more of the user equipment 101a-n or in a storage in the content delivery network system 100. Caching such spatial object history can enhance the efficiency of the use of state trajectories in determining an order for searching the bucket or buckets of the dynamic ordered tree structures, such as R trees, as well as enhance the efficiency of a context enhanced search based at least in part on such spatial object history, according to exemplary embodiments.

Figure 6:
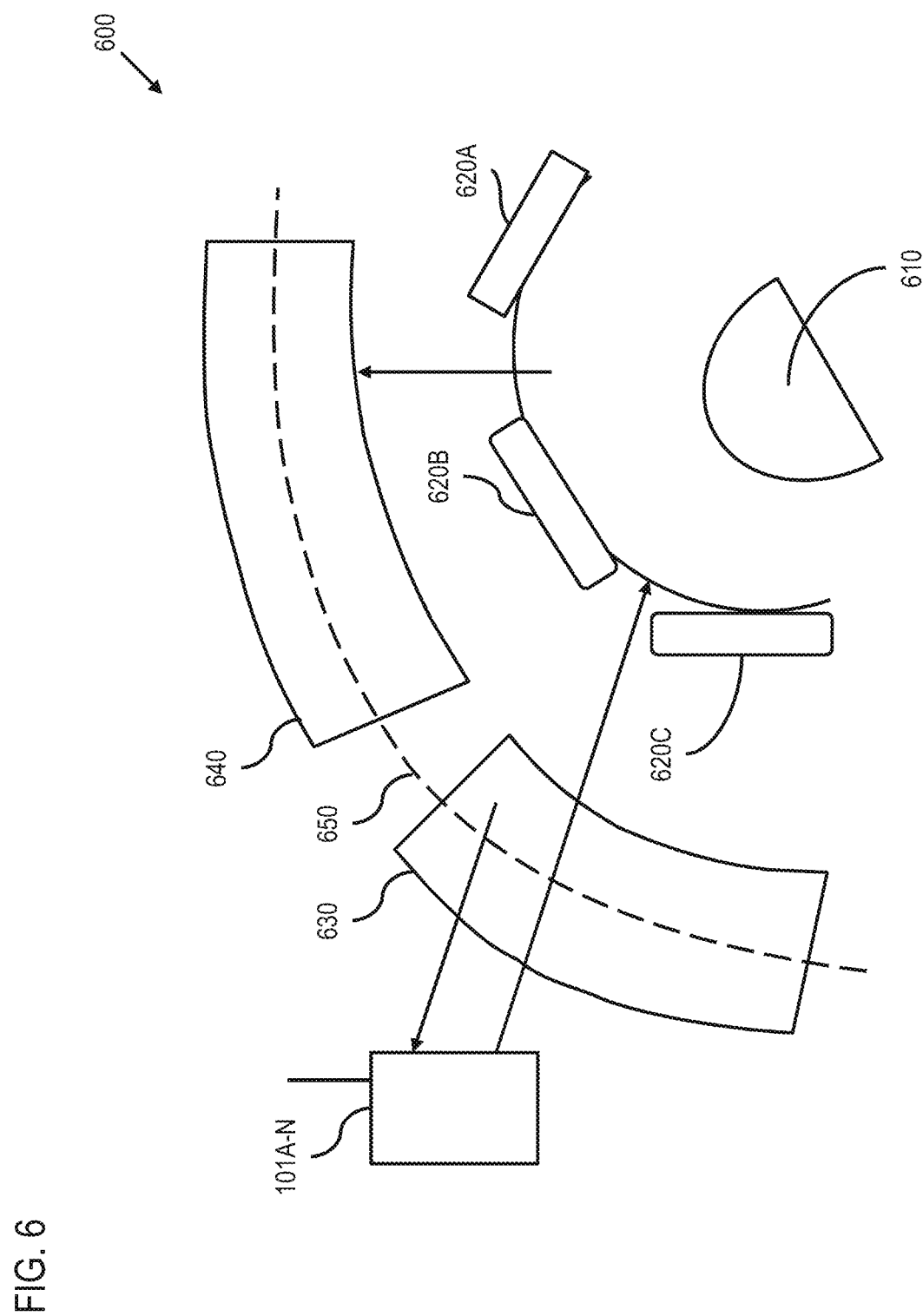
FIG. 6 is a diagram of an example of a content delivery network system for context enhanced searching as can be implemented by dynamic ordered tree structures, according to exemplary embodiments.

FIG. 6 is a diagram of an example of a content delivery network system 600 illustrating levels for data storage for context enhanced searching as can be implemented by dynamic ordered tree structures, according to exemplary embodiments. In the content delivery network system 600, one or more core data centers 610 typically can maintain, store and communicate master data at a core level as can be used in context enhanced searching. Extending outward from the core data centers 610 are typically a plurality of regional data centers, such as regional data centers 620A, 620B and 620C, for example, for also storing, maintaining and communicating a regional level of data, that typically can be accessed relatively faster in response to queries than data at the core data centers 610, such as can be used for various regional dependent workloads typically. At the outer level 650 of the content delivery network 600 there are the edge data centers, such as edge data centers 630 and 640, for storing, maintaining and communicating an outer level of data, which typically can be accessed relatively faster in response to queries than data at regional data centers 620A-C and at the core data centers 610, for example.

According to exemplary embodiments, as to data stored at the edge data centers 630 and 640, the edge data centers 630 and 640 typically have certain caching capabilities so data is more easily accessible, such as to user equipment 101a-n, the user equipment 101a-n sending queries and receiving information and data in response to the queries as indicated by the arrowed lines in the content delivery network system 600, for example. Caching of data at the edge data centers 630 and 640, such as data related to spatial object history, can enhance the efficiency of the use of state trajectories and a context enhanced search in determining an order for searching the bucket or buckets of the dynamic ordered tree structures, such as R trees. Also storage of data at the edge data centers 630 and 640 can facilitate movement and percolation of data within the content delivery network system 600. Further, the edge data centers, such as edge data centers 630 and 640, are typically connected with regional settings at the regional data centers, such as regional data centers 620A-C, in terms of types of data and types of bounding boxes, such as those related to location, status or user or provider criteria, for example, such as can be related to what a user or customer such as of user equipment 101a-n, can likely request in queries, as related to a particular city or country, or other criteria, for example.

According to exemplary embodiments, the content delivery network system 100 and the content delivery network system 600, implementing the state trajectories for the dynamic ordered tree structures, such as in FIGS. 3 and 4, for context enhanced searching, promotes facilitating alignment of the ability to easily navigate around the various indices and the various levels of data storage at the core, regional and edge data centers or data layers. Also, according to exemplary embodiments, data, including data related to observation of the history of spatial objects, such as map tiles or other geographical data, over the state space trajectories, for example, can typically be more easily presented and manipulated, such as where the data is stored or cached at various levels, such as at one or more of the core data centers 610, the regional data centers 620A-C, the edge data centers 630 and 640 and the user equipment 101a-n.

Moreover, according to exemplary embodiments, the content delivery network systems 100 and 600 can provide a highly distributed infrastructure for percolation and prepercolation of data, such as implemented by processors in the user equipment 101a-n and in various of the content delivery managers (CDM) of the content delivery network systems 100 and 600, such as by the tree index platform 103, for example. Implementing the state trajectories in traversing dynamic ordered tree structures, as described, in such highly distributed infrastructure can enhance efficient distribution over objects or points, such as the map tiles, and promote efficient context enhanced searching by such multilevel data storage, as described, such as by minimizing a number of hits at the regional or core data centers, for example, in processing the queries.

Moreover, according to exemplary embodiments, the use of state trajectories for traversing dynamic ordered tree structures with multiple level caching and storage in the content delivery network systems, such as content delivery network systems 100 and 600, can also enhance and facilitate managing capacities and predetermined content within the content data managers (CDM) in the content delivery network systems 100 and 600, for example. Therefore, content enhanced searching, according to exemplary embodiments, can promote minimizing operational costs, since there can be typically less cycles of the processors in the CDM's of the content delivery network systems 100 and 600, as well as minimizing traffic for queries and responses such as through various switches and routers on the infrastructural level.

In this regard, for example, context enhanced searching, according to exemplary embodiments, likely invokes less platform dependent calls between and during the application program interfaces (APIs) when serving a query. And, as such, enhanced context searching, according to exemplary embodiments, promotes minimizing the number of queries that are penetrating down to the coordinator centers, such as to the regional data centers 620A-C and the core data centers 610. Therefore, according to exemplary embodiments, in context enhanced searching with the multilevel data storage and state space trajectories, such as for determining, likely or probable status, location or criteria, for servicing queries, the content delivery network systems 100 and 600, for example, can allow a significant amount of queries to be served by the edge data centers 630 or 640 or the regional data centers 620A-C, in order to find the entry point of the state trajectories for the dynamic ordered tree structures, such as R-trees, so that a landing zone or landing point on the trajectory, such as located in one or more of the core data centers 610, the regional data centers 620A-C, the edge data centers 630 and 640 or the user equipment 101a-n, can be provided to efficiently serve and complete the resolution of the query.

In this regard, according to exemplary embodiments, the context enhanced searching with the state trajectories of the dynamic ordered trees and the multilevel of data effectively and efficiently streamlines the search process by minimizing and preventing the queries from going all the way to the core data centers 610. Queries would only typically reach the core data centers 610 where none of the regional data centers 620A-C have the pre-cached R-tree buckets for responding to the query or have the requisite point or points defined by the trajectory. Therefore, a query, such as to for a point or points, such as map tiles, to resolve the query, would typically go to the core data centers 610 when there is not a hit or a resolution and no landing zone within the regional data centers, such as regional data centers 620A-C, in order to resolve that query, such as where the point, such a map tile, is missing at the higher level data storage areas. Further, according to exemplary embodiments, the context enhanced searching, facilitates simplifying and leveraging the capabilities of the content delivery systems, such as in content delivery network systems 100 and 600, such as where the structures and the platforms for the data storage areas are heavily loaded, i.e. those areas that are densely populated.

Also, according to exemplary embodiments, the content delivery network system 100 or 600 can, in terms of infrastructure, include a number of hubs of various storage providers, such as can partner with other storage providers, to form a content delivery network system interconnected by and forming a highway for servicing requests and storage of data to resolve the requests. The state trajectories for the dynamic tree structures can include reference to various levels of data storage at the various hubs, such as at edge, regional or core data centers to enhance servicing of queries for resolving the query, such as including a requisite point defined by the trajectory. Such hubs can be distributed globally and be co-located or allocated to the zones related to need for servicing different requests, such as based upon various areas in terms of the service requests, and the different service requests could be serviced based on surge, routing, traffic requests, mapping, or the construction of those, for example.

Figure 7A:
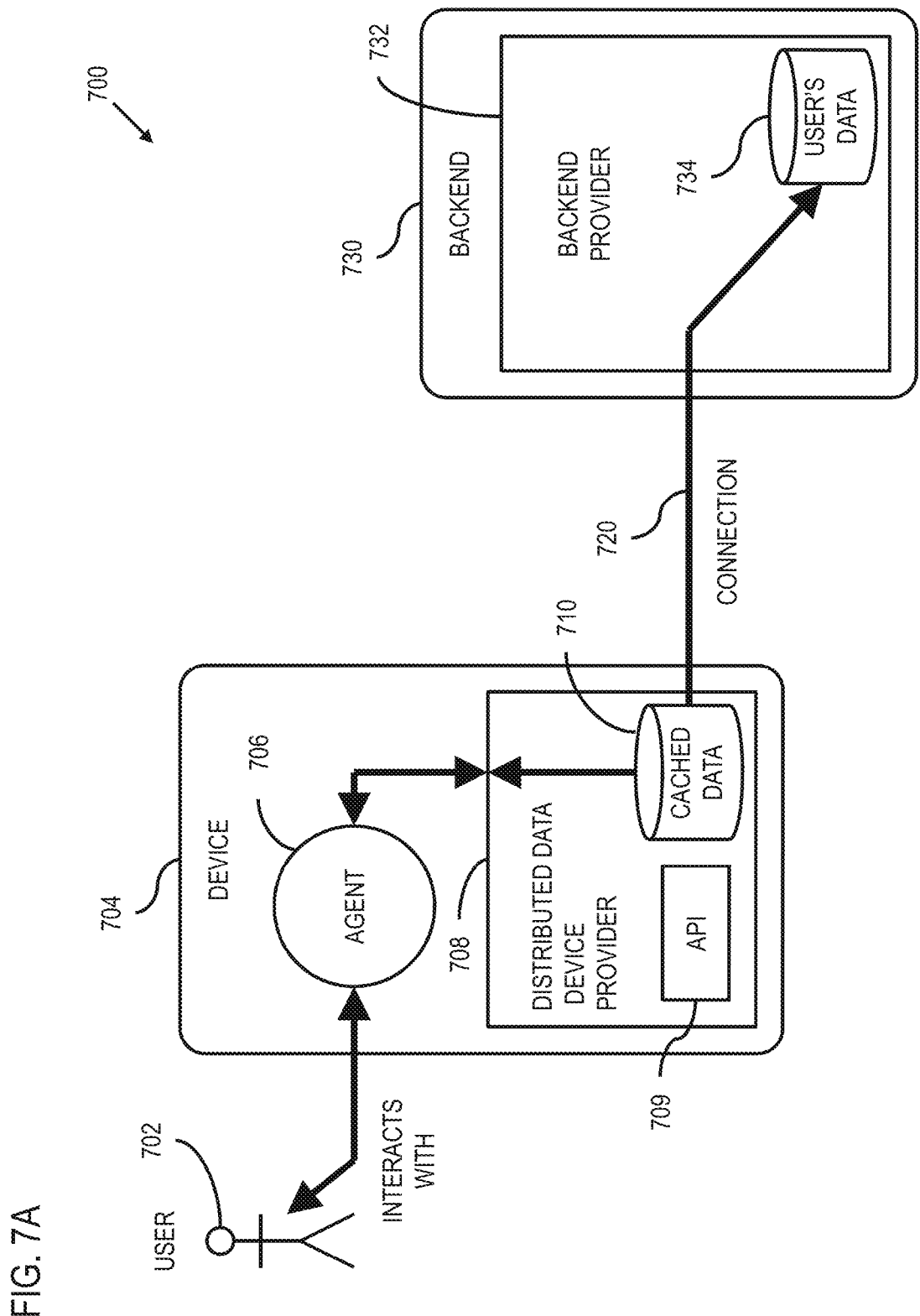
FIG. 7A is a diagram illustrating a user device interface interacting with a backend provider in a content delivery network for implementing context enhancing searching using dynamic ordered tree structures, according to one embodiment.
Figure 7B:
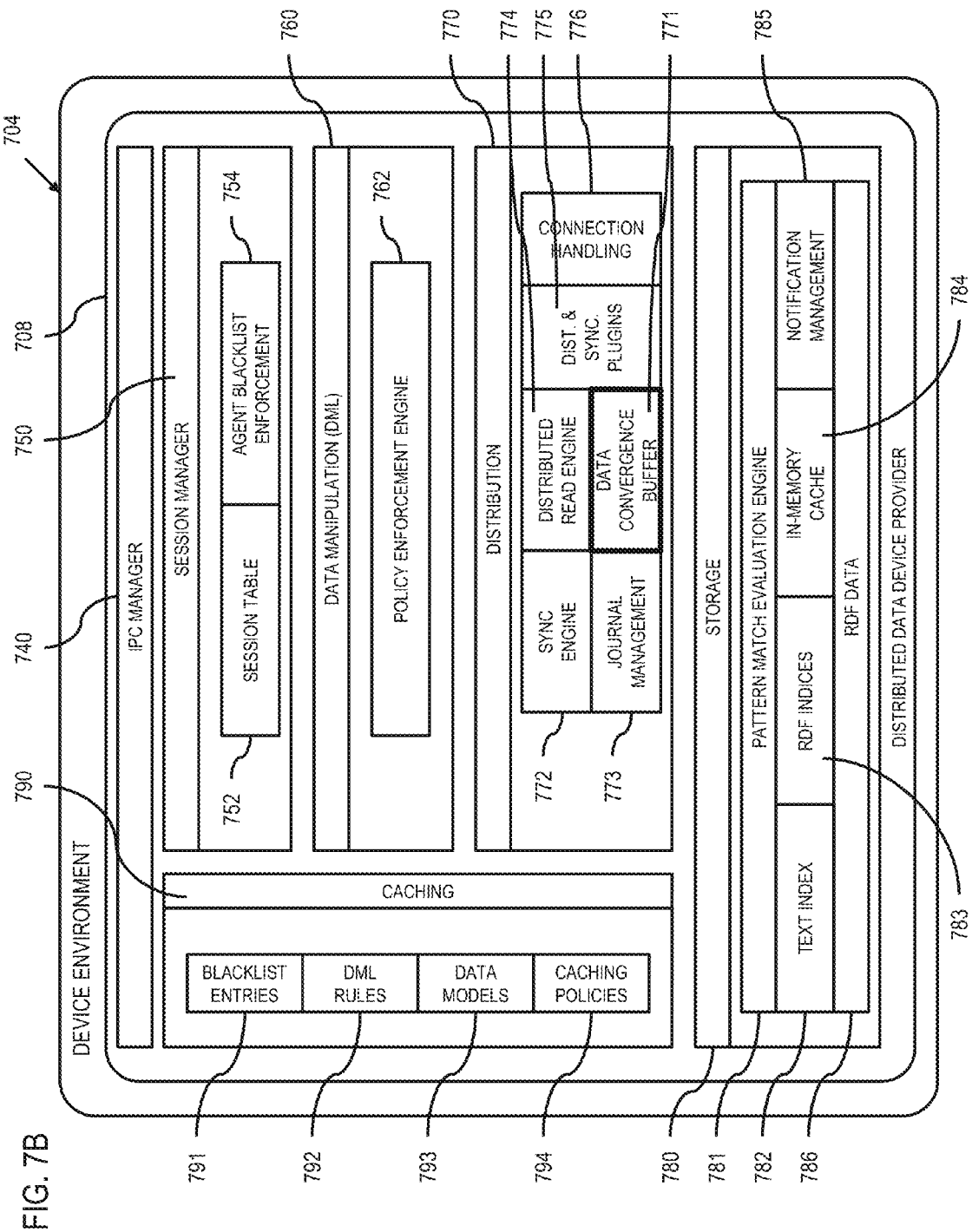
FIG. 7B is a diagram of an exemplary distributed data device provider operating system in a user device interface for implementing context enhancing searching using dynamic ordered tree structures, according to one embodiment.
Figure 7E:
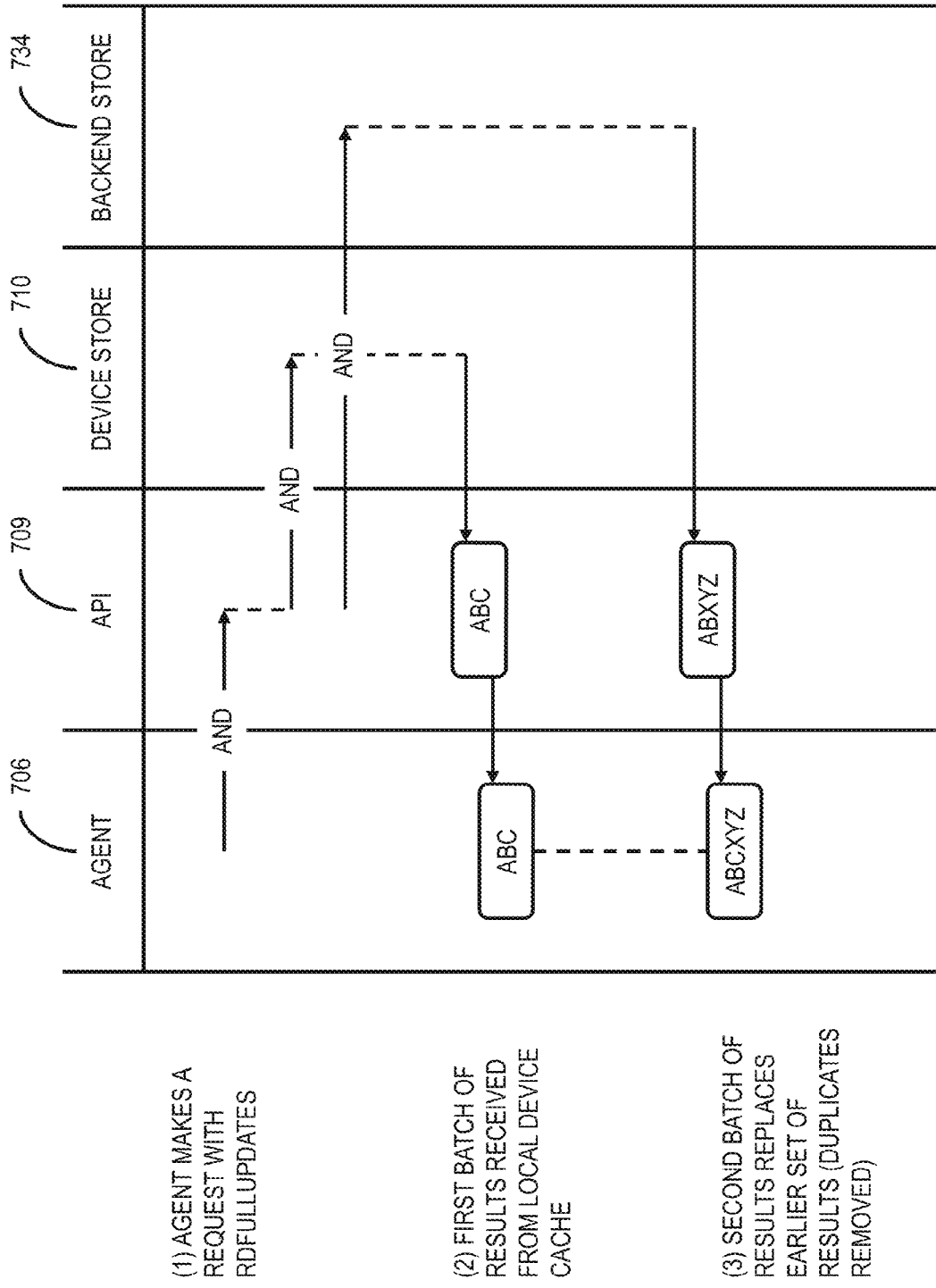
FIG. 7E is a diagram of a further exemplary process flow in providing search results implementing context enhancing searching using dynamic ordered tree structures, according to one embodiment.
Figure 7F:
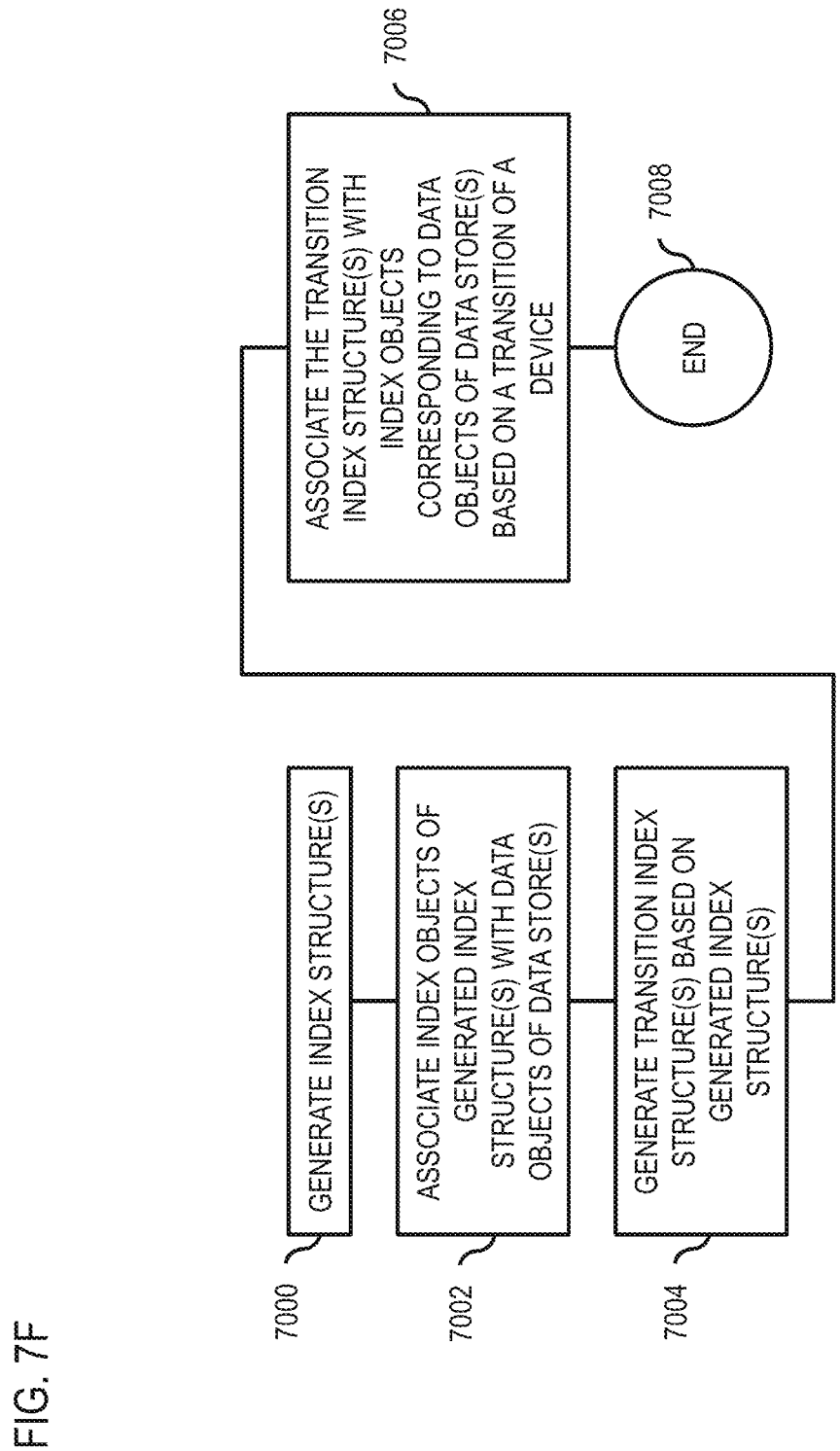
FIG. 7F is a diagram of an exemplary process flow for implementing context enhancing searching using dynamic ordered tree structures, according to exemplary embodiments.
Figure 9:
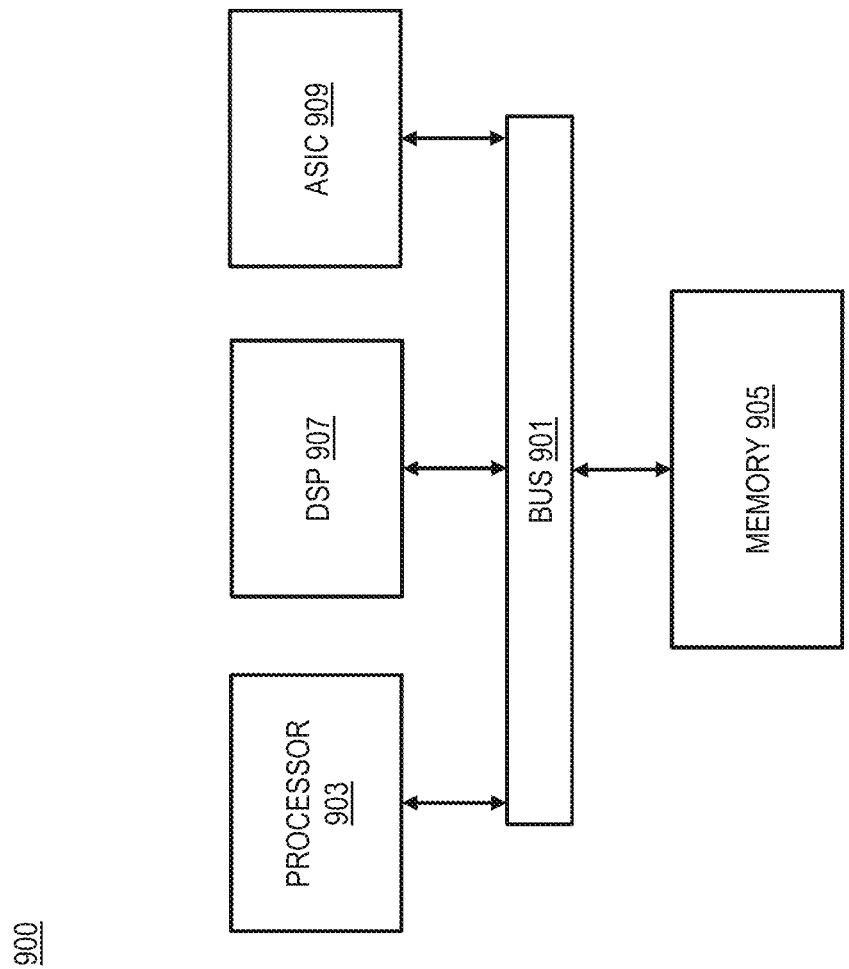
FIG. 9 is a diagram of a chip set that can be used in a content delivery network to implement context enhancing searching using dynamic ordered tree structures in an embodiment of the invention.

Referring now to FIG. 7F, an exemplary process flow for implementing context enhanced searching using dynamic ordered tree structures, according to exemplary embodiments, is described with reference to the content delivery network systems 100 and 600 of FIGS. 1, 2 and 6 and the dynamic ordered tree structures of FIGS. 3 and 4. In exemplary embodiments, one or more of the tree index platform 103, the user equipment 101a-n or processors in the content delivery network systems 100 or 600 causes, determines or performs the process and is implemented in, for instance, a chip set including a processor and a memory as shown in FIG. 9.

At Step 7000, at least one or more dynamic ordered tree structures such as R-tree index structures 310 or 400A are determined and caused to be generated. Then at Step 7002, index objects such as associated with points 314 or 414, such as map tiles, for example, are associated or bound to one or more data objects of one or more data stores, such as associated with points 314 or 414, such as map tiles, for example, in the content delivery network systems 100 or 600, for example. The dynamic order tree structures are stored in a memory storage in the content delivery network system 100 or 600, such as on a user device 101a-n or in the tree index platform 103, for example. The binding, for instance, associates the individual data objects of a data store with the corresponding index objects, nodes or points of the index tree structure, such as with the points 314 or 414, such as map tiles, as can be located in one or more of the core data centers 610, the regional data centers 620A-C or the edge data centers 630 and 640, for example. By way of example, the building of the dynamic ordered tree structures, such as R-trees 310, 400A and 400B, can be based upon one or more of a current or past status, location or user or provider criteria, for example, based upon the previously described algorithms or relations.

Where a query is caused or determined to be generated, such as by the processors and memory, such as in one or more of the user equipment 101a-n or in the tree index platform 103 in the content delivery network system 100 or 600, in determining or causing to process the query, the processors and memory determine or cause to determine the presence, or absence, of state trajectory indexes of the stored, or current, dynamic ordered tree structures or index structures, such as R-trees, of or associated with that client device, such as associated with user equipment 101a-n, to determine a presence, or absence, of potential points, such as map tiles, that likely are needed for resolution of the query or queries.

Where a stored or current dynamic ordered tree structure or index structure is present, such as in one or more of the user equipment 101a-n or in the tree index platform 103 in the content delivery network system 100 or 600, for example, the processors and memory, such as in one or more of the user equipment 101a-n or in the tree index platform 103 in the content delivery network system 100 or 600, for example, determine or cause to generate a search for data to resolve the query in the content delivery network system 100 or 600, based on one or more current or stored dynamic ordered tree structure indexes, such as R-tree indexes, having points, such as points 314 and 414, such as map tiles, likely to resolve the generated query or queries.

The processors and memory, such as in one or more of the user equipment 101a-n or in the tree index platform 103 in the content delivery network system 100 or 600, for example, determine or cause to find or locate the stored data corresponding to the points, nodes or data objects, such as points 314 or 414, such as map tiles, in the one or more current or stored determined dynamic ordered tree structure indexes to resolve the query at the corresponding data storage associated with the one or more points, such as map tiles, as in one or more of the core data centers 610, the regional data centers 620A-C or the edge data centers 630 and 640, for example.

Then, the processors and memory, such as in one or more of the user equipment 101a-n or in the tree index platform 103 in the content delivery network system 100 or 600, for example, cause or determine to return to the found data corresponding to points, such as points 314 and 414, such as map tiles, from the search to a source for the generated query, such as user equipment 101a-n (e.g., a smartphone, cell phone, portable computer, and the like) the resolve the query.

Where, however, it is determined by the processors and memory, such as in one or more of the user equipment 101*a-n* or in the tree index platform 103 in the content delivery network system 100 or 600, for example, that one or more current or stored dynamic ordered tree structures indexes, such as indexes for R-trees 310 or 400A, will likely not resolve or satisfy a generated query or queries, such as where a transition of a device has occurred, such a changed location, status, or user or provider criteria, such as where a user or user equipment 101*a-n* moves from one country or region to another country or region, the process proceeds to Step 7004.

At Step 7004, the processors and memory, such as in one or more of the user equipment 101*a-n* or in the tree index platform 103 in the content delivery network system 100 or 600, for example, determine or cause to generate one or more transition index structures, such as can be based on one or more current, or stored, generated index structures, as by traversing or as by a transition of one or more state trajectories, based upon the described algorithms and relations for the projected or probable states transition, for a dynamic ordered tree structure index, such as an R-tree index, based upon, or related to a transition in location, status or criteria, to facilitate efficiently and simply resolving the generated query or queries. The causing or determining to generate a transition of one or more state trajectories, such as illustrated in the transition state trajectories in going from the R-tree 400A to the R-tree 400B of FIG. 4, for example, can be based on, or triggered, by changes of any selected properties of multidimensional data stored in an R-tree and synced with an R-tree traversing mechanism, such as by implementation of the described algorithms and relations, for example, From Step 7004 the process proceeds to Step 7006. At Step 7006, the processors and memory, such as in one or more of the user equipment 101*a-n* or in the tree index platform 103 in the content delivery network system 100 or 600, for example, determines or causes to generate an association of the projected states of the points 414, such as map tiles, to the one or more transition state dynamic ordered tree structure indexes, such as one or more R-tree indexes, such as R-tree index 400B, likely needed for a particular category of trajectory or trajectories, such as home, leisure or work, based on a transition of a status, location or criteria, such as by a user equipment 101*a-n*, for example. Therefore, at Step 7006, the processors and memory, such as in one or more of the user equipment 101*a-n* or in the tree index platform 103 in the content delivery network system 100 or 600, for example, determines or causes to associate the one or more transition index structures with index objects or points corresponding to data objects of one or more data stores based on a transition of a device, such as a transition of a user equipment 101*a-n*.

The determining or causing to generate an association of the projected states of the points, such as map tiles, likely needed for a particular category of trajectory or trajectories, such as home, leisure or work, based on a transition of a status, location or criteria, for example, for resolution of the generated query or queries, at Step 7006, is illustrated, for example, by the arrows (I), (II) and (III) in traversing from the state trajectory for the index structure for R-tree 400A to the state trajectory for the transition index structure for R-tree 400B. From Step 7006, the process then proceeds as previously described for resolution of the query, and then proceeds to End at Step 7008.

Figure 7G:
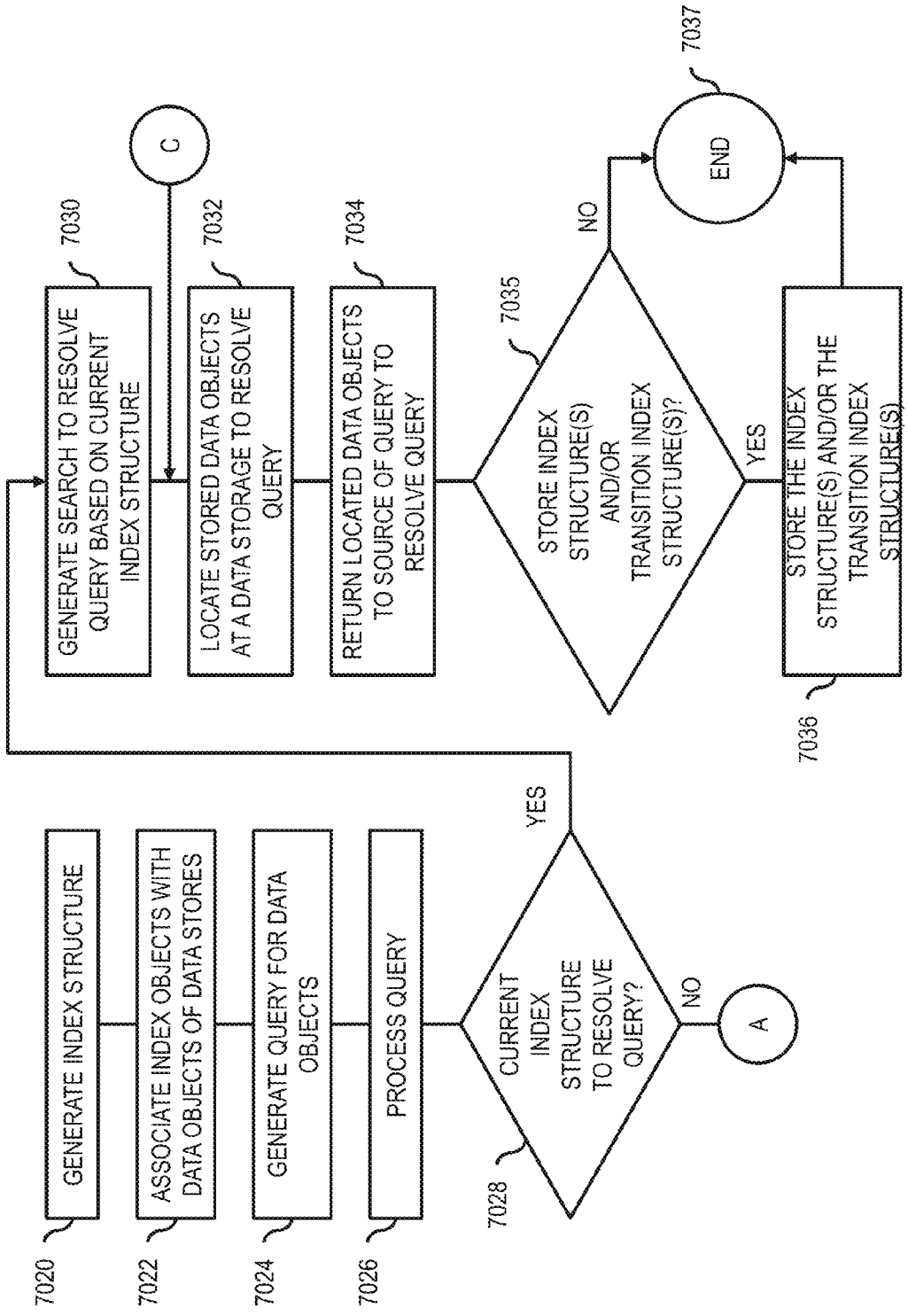
FIGS. 7G-7I are diagrams of exemplary process flows for implementing context enhancing searching using dynamic ordered tree structures to resolve a query, according to exemplary embodiments.
Figure 7H:
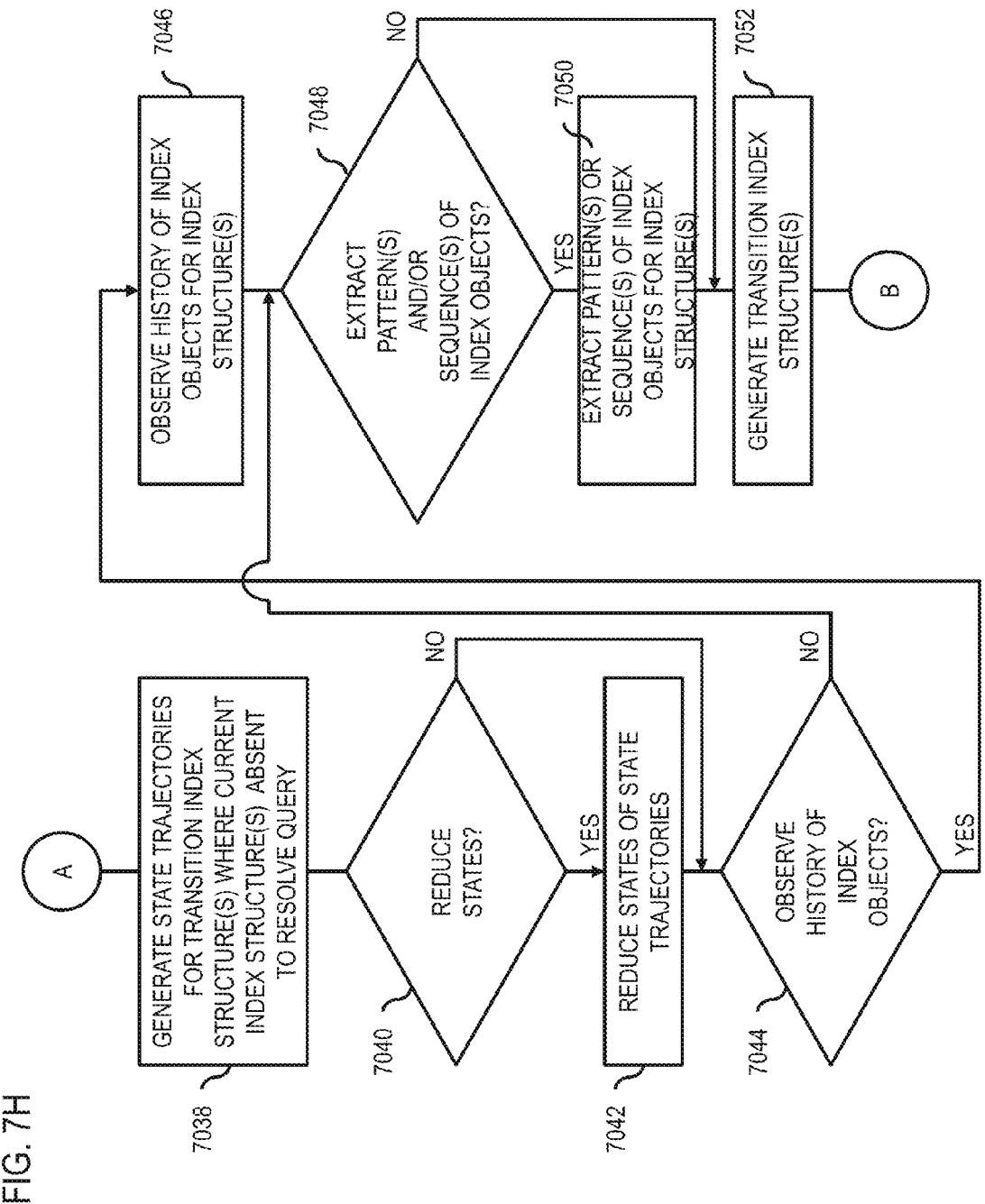
Figure 7I:
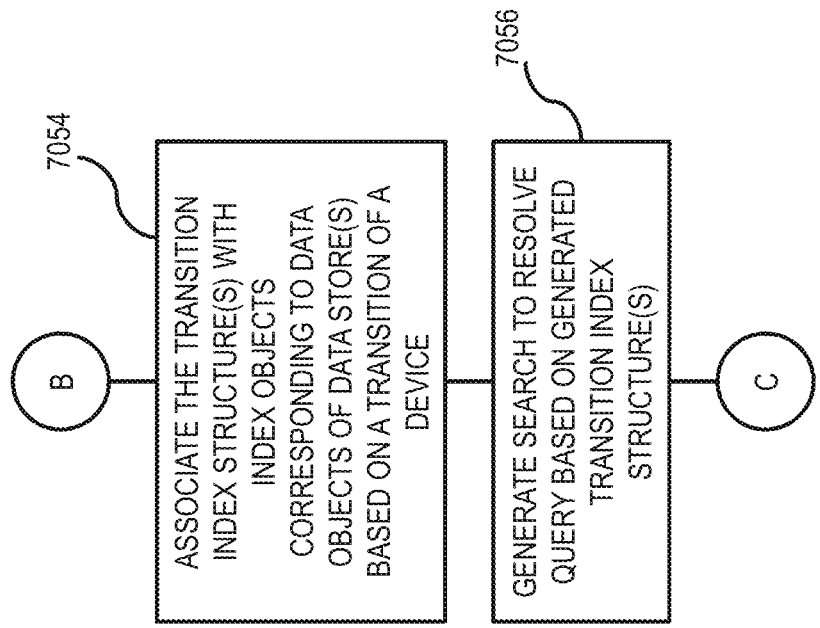

Referring now to FIGS. 7G-7I, exemplary process flows for implementing context enhanced searching using dynamic ordered tree structures for resolving a query, according to exemplary embodiments, are described with reference to the content delivery network systems 100 and 600 of FIGS. 1, 2 and 6 and the dynamic ordered tree structures of FIGS. 3 and 4. In exemplary embodiments, one or more of the tree index platform 103, the user equipment 101*a-n* or processors in the content delivery network system 100 or 600 causes, determines or performs the process and is implemented in, for instance, a chip set including a processor and a memory as shown in FIG. 9.

The process of FIGS. 7G-7I begins at Step 7020. At Step 7020, at least one or more dynamic ordered tree structures or index structures such as R tree index structures 310 or 400A are determined and caused to be generated, such as for use in query resolution. Then at Step 7022, the generated index structures are caused to be associated or bound to one or more index objects or data objects of one or more data stores, such as associated with nodes, data objects or points 314 or 414, such as map tiles, for example, in the content delivery network systems 100 or 600, for example. The dynamic order tree structures are stored in a memory storage in the content delivery system 100, such as on a user device 101*a-n* or in the tree index platform 103, for example. The binding, for instance, associates the individual data objects, nodes or points of one or more data stores with the corresponding index objects, points or nodes of the one or more generated index tree structures, such as with the points, nodes or data objects 314 or 414, such as map tiles, as can be located or stored in one or more data stores, such as the core data centers 610, the regional data centers 620A-C or the edge data centers 630 and 640, for example. By way of example, the building of the dynamic ordered tree structures, such as R-trees 301 and 400A, can be based upon one or more current or stored index structures, as well as can be based on a current or past status, location or user or provider criteria, for example, based upon the previously described algorithms or relations.

Then at Step 7024, the processors and memory, such as in one or more of the user equipment 101*a-n* or in the tree index platform 103 in the content delivery network system 100 or 600, determine and cause to generate one or more queries, such as from a client device, such as user equipment 101*a-n*, that is in a current status, location or criteria. At Step 7026, processors and memory, such as in one or more of the user equipment 101*a-n* or in the tree index platform 103, such as can be implemented in, for instance, a chip set including a processor and a memory as shown in FIG. 9, determine or cause to process the generated query.

Then, at Step 7028, in determining or causing to process the query, the processors and memory determine or cause to determine whether there is a presence, or absence, of current or stored index structures, such as including state trajectory indexes of the stored or current dynamic ordered tree structures, such as R-trees, of or associated with that client device, such as associated with user equipment 101*a-n*, to resolve the query or queries, such as including potential points, nodes or data objects, such as map tiles, that likely are needed for resolution of the query or queries.

At Step 7028, where the processors and memory, such as in one or more of the user equipment 101*a-n* or in the tree index platform 103 in the content delivery network system 100 or 600, for example, determine or cause to determine that one or more current or stored dynamic ordered tree index structures, such as indexes for R-trees 310 and 400A, can be used to resolve the query or queries, such as based upon a current or likely status, location or criteria, using the described algorithms and relations, the process proceeds to Step 7030.

At Step 7030, the processors and memory, such as in one or more of the user equipment 101*a-n* or in the tree index platform 103 in the content delivery network system 100 or 600, for example, determine or cause to generate a search to resolve the query or queries for data to resolve the query in the content delivery network 100 or 600, such as based on one or more current or stored index structures, such as dynamic ordered tree structure indexes, such as R-tree indexes, having points, nodes or data objects, such as points 314 and 414, such as map tiles, likely to resolve the generated query or queries.

From Step 7030 the process proceeds to Step 7032. At Step 7032, the processors and memory, such as in one or more of the user equipment 101a-n or in the tree index platform 103 in the content delivery network system 100 or 600, for example, determine or cause to locate or find the stored data or data objects corresponding to the nodes, data objects or points, such as points 314 or 414, such as map tiles, in the one or more determined dynamic ordered tree structure indexes to resolve the query at the corresponding one or more data storages associated with the one or more nodes, data objects or points, such as map tiles, as in one or more of the core data centers 610, the regional data centers 620A-C or the edge data centers 630 and 640, for example.

From Step 7032 the process proceeds to Step 7034. At Step 7034, the processors and memory, such as in one or more of the user equipment 101a-n or in the tree index platform 103 in the content delivery network system 100 or 600, for example, cause or determine to return the located or found data or data objects corresponding to nodes, data objects or points, such as points 314 and 414, such as map tiles, from the search to a source for the generated query, such as user equipment 101a-n (e.g., a smartphone, cell phone, portable computer, and the like) to resolve the query.

From Step 7034, the process then proceeds to Step 7035, where it is determined by the processors and memory, such as in one or more of the user equipment 101a-n or in the tree index platform 103 in the content delivery network system 100 or 600, for example, whether to store one or more of index structures and transition index structures to generate a further transition index structure based on a further transition, such as of a device, such as user equipment 101a-n.

If it is determined, at Step 7035, to store one or more of index structures and transition index structures, the process proceeds to Step 7036 and stores the one or more of index structures and transition index structures in a storage or memory, such as storing updated, determined dynamic ordered transition index structures, such as the R tree 400B index structure, such as in one or more of the user equipment 101a-n or in the tree index platform 103 in the content delivery network system 100 or 600, for example. The process then proceeds to End at Step 7037. However, if at Step 7035 it is determined not to store one or more of index structures and transition index structures, the process proceeds to End at Step 7037. Upon a determination or cause to generate another query, such as by user equipment 101a-n, the process proceeds from End at Step 7037 to return to Step 7020.

Where, however, at Step 7028, the processors and memory, such as in one or more of the user equipment 101a-n or in the tree index platform 103 in the content delivery network system 100 or 600, for example, determine or cause to determine that one or more current or stored dynamic ordered tree index structures, such as indexes for R-trees 310 and 400A, cannot likely be used to resolve the query or queries, such as based upon a current or likely status, location or criteria, using the described algorithms and relations, the process proceeds to Step 7038.

At Step 7038, the processors and memory, such as in one or more of the user equipment 101a-n or in the tree index platform 103 in the content delivery network system 100 or 600, for example, determine or cause to generate state trajectories for one or more transition index structures where a current index structure is absent to resolve a query, such as by traversing or a transition of one or more state trajectories, based upon the described algorithms and relations for the projected or probable states transition, for a dynamic ordered tree structure index, such as an R-tree index, based upon, or related to, a transition in location, status or criteria, to facilitate efficiently and simply resolving the generated query or queries.

At Step 7038, causing or determining to generate a transition of one or more state trajectories, such as illustrated in the transition state trajectories in going from the R-tree 400A to the R-tree 400B of FIG. 4, for example, can be based on, or triggered, by changes of any selected properties of multidimensional data stored in an R-tree and synced with an R-tree traversing mechanism, such as by implementation of the described algorithms and relations, for example, In determining or causing to generate state trajectories for one or more transition index structures, such as by a transition or traversal of one or more state trajectories, at Step 7038, the processors and memory, such as in one or more of the user equipment 101a-n or in the tree index platform 103 in the content delivery network system 100 or 600, for example, based upon the described algorithms and relations for state trajectories or analysis as to projected or probable states, for example, causes or determines to generate one or more state trajectories, such as going from R-tree 400A to R-tree 400B, such as to determine one or more state trajectory indexes, such as for determining R-tree index structure 400B.

The determining or causing to generate state trajectories for one or more transition index structures at Step 7038 typically causes or determines to define a finite set of possible future states in R-tree indexes and respective fan-outs at one or more given points in the relatively near future for query resolution for a generated query or queries. The determining or causing to generate one or more state trajectories for one or more transition index structures at Step 7038, according to exemplary embodiments, can also cause or determine to reduce possible future states for a transition state trajectory or trajectories.

As such, the process proceeds to Step 7040, where the processors and memory, such as in one or more of the user equipment 101a-n or in the tree index platform 103 in the content delivery network system 100 or 600, for example, based upon the described algorithms and relations for state trajectories or analysis as to projected or probable states, for example, causes or determines whether to reduce possible future states for a transition state trajectory or trajectories. If so, the process proceeds to step 7042 where the processors and memory, such as in one or more of the user equipment 101a-n or in the tree index platform 103 in the content delivery network system 100 or 600, for example, determine or cause to reduce states of the one or more state trajectories for the one or more transition index structures, such as by removing from consideration potential states or potential state trajectories that are not likely or not probable as to resolution of the query or queries under consideration. From Step 7042, the process proceeds to Step 7044.

However, if at Step 7040 the processors and memory, such as in one or more of the user equipment 101a-n or in the tree index platform 103 in the content delivery network system 100 or 600, for example, determine or cause not to reduce states of the one or more state trajectories for the one or more transition index structures, the process proceeds to Step 7044.

At Step 7044, the processors and memory, such as in one or more of the user equipment 101*a-n* or in the tree index platform 103 in the content delivery network system 100 or 600, for example, based upon the described algorithms and relations for state trajectories or analysis as to projected or probable states, for example, causes or determines whether to observe a history of index objects for one or more generated index structures to determine the one or more transition index structures.

If so, the process proceeds to step 7046 where the processors and memory, such as in one or more of the user equipment 101*a-n* or in the tree index platform 103 in the content delivery network system 100 or 600, for example, determines or causes to observe a history of index objects for one or more generated index structures to determine the one or more transition index structures, such as by determining or causing to observe the history of any given spatial object within one or more R-tree structure indexes, for example. From Step 7046, the process proceeds to Step 7048.

However, if at Step 7044, the processors and memory, such as in one or more of the user equipment 101*a-n* or in the tree index platform 103 in the content delivery network system 100 or 600, for example, determine or cause not to observe a history of index objects for one or more generated index structures to determine the one or more transition index structures, the process proceeds to Step 7048.

At Step 7048, the processors and memory, such as in one or more of the user equipment 101*a-n* or in the tree index platform 103 in the content delivery network system 100 or 600, for example, based upon the described algorithms and relations for state trajectories or analysis as to projected or probable states, for example, causes or determines whether to determining to extract at least one pattern of index objects, at least one sequence of index objects, or a combination thereof, to determine the one or more transition index structures, such as to resolve a query or queries.

If at Step 7048 it is caused or determined to extract at least one pattern of index objects, at least one sequence of index objects, or a combination thereof, the process proceeds to Step 7050. At Step 7050, the processors and memory, such as in one or more of the user equipment 101*a-n* or in the tree index platform 103 in the content delivery network system 100 or 600, for example, determines or causes to extract at least one pattern of index objects, at least one sequence of index objects, or a combination thereof, to determine the transition index structure, such as determining or causing to extract one or more of a pattern or patterns and sequence or sequences of one or more spatial objects, nodes or points, such as map tiles, in relation to determining the transition state trajectories for the one or more transition index structures, such as from R-tree 400A to R-tree 400B, for example, in query resolution. The causing or determining to extract patterns or sequences can be those of relatively current or recent state trajectory or trajectories for dynamic ordered tree structures indexes, such as for R-tree indexes, for example. From Step 7050, the process proceeds to Step 7052.

However, if at Step 7048, the processors and memory, such as in one or more of the user equipment 101*a-n* or in the tree index platform 103 in the content delivery network system 100 or 600, for example, determine or cause not to extract at least one pattern of index objects, at least one sequence of index objects, or a combination thereof, to determine the transition index structure, the process proceeds to Step 7052.

At Step 7052, the processors and memory, such as in one or more of the user equipment 101*a-n* or in the tree index platform 103 in the content delivery network system 100 or 600, for example, based upon the described algorithms and relations for state trajectories or analysis as to projected or probable states, for example, causes or determines to generate the one or more transition index structures to resolve the one or more queries.

From Step 7052, the process proceeds to Step 7054. At Step 7054, the processors and memory, such as in one or more of the user equipment 101*a-n* or in the tree index platform 103 in the content delivery network system 100 or 600, for example, determines or causes to associate the one or more transition index structures with index objects, nodes or points, such as points 414, of R-tree transition index structure 400B, corresponding to data objects of one or more data stores, such as the core data centers 610, the regional data centers 620A-C or the edge data centers 630 and 640, for example, such as based on a transition of a device, such as a transition by user equipment 101*a-n*, for example. The processors and memory, such as in one or more of the user equipment 101*a-n* or in the tree index platform 103 in the content delivery network system 100 or 600, for example, can generate an association of the projected states of the nodes, data objects or points 414, such as map tiles, to the one or more transition state dynamic ordered tree transition index structures, such as one or more R-tree transition index structures, such as the R-tree transition index structure 400B, likely needed for query resolution, such as for a particular category of trajectory or trajectories, such as home, leisure or work, based on a transition of a status, location or criteria, such as by a user equipment 101*a-n*, for example.

Also, at Step 7054, the determining or causing to generate an association of the projected states of the index objects, data objects or points, such as map tiles, likely needed for query resolution, such as for a particular category of trajectory or trajectories, such as home, leisure or work, based on a transition of a status, location or criteria, for example, for resolution of the generated query or queries, is illustrated, for example, by the arrows (I), (II) and (III) in traversing from the state trajectory for the current or stored generated R-tree index structure 400A to the state trajectory for the R-tree transition index structure 400B.

From Step 7054, the process then proceeds to Step 7056. At Step 7056, the processors and memory, such as in one or more of the user equipment 101*a-n* or in the tree index platform 103 in the content delivery network system 100 or 600, for example, determines or causes to generate one or more searches to resolve the one or more queries based on the generated one or more transition index structures. From Step 7056, the process then proceeds to Step 7032 and proceeds as previously described for resolution of the query or queries.

In implementing exemplary process flows for context enhanced searching using dynamic ordered tree structures, according to exemplary embodiments, such as described and illustrated in relation to FIGS. 1, 2, 3, 4, 6, 7F and 7G-7I, for example, there is typically a system which includes a client server, such as associated with the tree index platform 103, and the client, such as a mobile terminal, communicating or associated with an infrastructure along with a platform. Where a request, such as a query, is received from a service, such as from the launching service, the query is typically shaped by a number of convenience application program interfaces (APIs) on the client side and then pushed over a communication network, such as over the content delivery network system 100, to the content of the platform infrastructure, such as in content delivery network system 600, for example. To resolve the query, the query is typically going to be decomposed to primitive queries, so as to enable checking with the different applications within the contents.

Also, since resolving the query typically proceeds according to a determined routing, such as based on the dynamic ordered tree structures indexes, such as tree index structures 400A or 400B, the process for resolution of the query typically expresses a particular source as the starting point and the destination. Since, in resolving the query, various data stores in the content delivery network system 600 are typically indicated for the routing, which can be across various levels, hubs or providers in the content delivery network system 100 or 600, such as can be across different countries, the query or request is typically decomposed into the primitive requests which can then be targeted for the very bottom levels and can be also targeted for different leaves within the tree.

In resolving the query, some of the leaves can have points, such as map tiles, that are acceptable in terms of the resolution, for example, and some of the leaves can have an unacceptable resolution, such as for a level where a consumer is at the moment on a client device. Such unacceptable resolution typically leads to inefficiency in resolving the query. As such, proceeding with resolution of the query without adjusting for the transition by traversing the state trajectories in the dynamic ordered tree structures, the resolution will typically look into the old leaves, as such to collect the indices, such as the map tiles. However, some of the leaves, without adjusting for the transition, can have the wrong content in terms of quality, such as in terms of resolution, which can lead to inefficiencies, such as in relation to missing queries or generating additional queries that are generated and propagated back to the data centers, such as typically to the regional data center. And so to minimize such inefficiency and to facilitate providing the content, such as corresponding to a map tile expeditiously, by adjusting for the transition by traversing the state trajectories in the dynamic ordered tree structures, according to exemplary embodiments, enables allowing to expose the search over an equivalent trajectory where each point of the tree would represent a number of basically indices that would then correspond to the (mainstream) content, such as the map tiles.

Therefore, according to exemplary embodiments, such adjustment for a transition facilitates eliminating a relatively excessive traversing operation. As a result, for example, there can be a regionally distributed content in the points, such as map tiles, that can be pre-percolated in different nodes behind the content delivery network. However, according to exemplary embodiments, the likelihood that there is a match in terms of the landing point can be significantly increased, so where the search should be basically extended in order to retrieve the necessary map tiles at the very end is facilitated. Then, once the elements for resolution of the query are collected, the query is served back through the content delivery network system 100 or 600 to resolve the query with the actual content and deliver the content to the client side, such as to the user equipment that generated the query.

Referring now to FIG. 7A, is a diagram 700 illustrating a user device, such as user equipment 101*a-n* interface interacting with a backend provider, such as in a content delivery network 100 for implementing context enhancing searching using dynamic ordered tree structures, according to exemplary embodiments. And FIG. 7B is a diagram of an exemplary Distributed Data Device Provider 708 operating system (OS) in a user device 704 interface for implementing context enhancing searching using dynamic ordered tree structures, according to exemplary embodiments.

FIG. 7A illustrates a user 702 that interacts with a user device 704, such as a mobile device or other user equipment 101*a-n*. The user device 704 includes one or more agents 706 such as an accessing agent, for receiving and presenting information or data to the user 702. The mobile device 704 includes a Distributed Data Device Provider 708, for a common data platform (e.g., a distributed data platform) illustrated in more detail in FIG. 7B. Within the Distributed Data Device Provider 708 is an application program interface (API) 709 and a storage, or device store, 710 for cached data, for example. The user device 704 communicates to a connection 720, such as one or more of a wired, wireless or satellite connection, with a backend 730, such as in the content delivery network system 100 or 600, for example. The backend 730 includes a backend provider 732, such as for servicing queries from the user device 704. The backend provider 732 includes a storage, or backend store, 734 for storing the user's data. Also, part of the API can also reside on the backend provider 732, as well as elsewhere in the content delivery network system 100 or 600, for example.

Referring to FIG. 7B, an exemplary Distributed Data Device Provider 708 within the user device 704 is illustrated as can be used for implementing context enhancing searching using dynamic ordered tree structures, according to exemplary embodiments. Within the device environment of user device 704, the Distributed Data Device Provider 708, typically includes an inter process communication (IPC) manager 740 which executes the API'S 709 within the Distributed Data Device Provider 708 and executes the API calls and generally controls operations of the user device 704, such as in relation to context enhanced searching, according to exemplary embodiments. The Distributed Data Device Provider 708 can also include a session manager 750 for managing the context enhanced searching sessions. The session manager can include a session table 752 as can be used in relation to search sessions and can include an agent blacklist enforcement module 754 to control search results, according to rules, such as in conjunction with a blacklist entries module 791 as can be included in the caching module 790. The caching module 790, in implementing caching for the Distributed Data Device Provider 708, can include the blacklist entries module 791, such as can be used to identify prohibited or blocked data or sites for data objects, for example. The blacklist entries module 791 can communicate rules to the agent blacklist enforcement module 754 in implementing context enhanced searching, for example.

The caching module 790, which can also include various rules modules, as can be used for operation of the Distributed Data Device Provider 708, can include a data manipulation language (DML) rules module 792 as can be used for adding, removing or updates to data, such as can be implemented by a data manipulation (DML) module 760. Also, caching module 790 can include a data models module 793 as can be used in relation to rules for data models in relation to context searching. The caching module 790 can also include a caching policies module 794 as can be used for implementing caching policies in relation to context searching. The Distributed Data Device Provider 708 can further include the data manipulation (DML) module 760 as can be used for adding, removing and updates to data for context searching. The data manipulation (DML) module 760 can include a policy enforcement engine 762 as can be used for enforcing policies related to data for context enhanced searching.

The Distributed Data Device Provider 708 can also include a distribution module 770 as can provide at least a part of a data convergence area for context enhanced searching. The distribution module 770 can include a data convergence buffer module 771 as can be used for holding data related to context enhancing searching for query resolution, according to exemplary embodiments. The distribution module 770 can further include a sync engine module 772 as can be used for synchronizing files and folders in relation to context enhanced searching. The distribution module 770 can also include a journal management module 773 for management of data entries in relation to context enhanced searching. Also, the distribution module 770 can include a distributed read engine module 774 as can be used in relation to execution of distributed data flow in context enhanced searching. A "dist. and sync." plugins module 775 in the distribution module 770 can include various plugin software or applications as can be used for distribution and synchronization of data operations in relation to context enhanced searching. The distribution module 770 can also include a connection handling module 776 as can be used to handle connections and communications of the user device 704 with the backend 730 or with other portions of content delivery network system 100 or 600, for example.

The Distributed Data Device Provider 708 can further include a storage module 780 for storage of data and operations in relation to context enhanced searching. The storage module 780 can include a pattern match evaluation engine module 781 as can be used in relation to patterns in data streams for context enhanced searching. A text index module 782 can also be included in the storage module 780 as can be used for indexing data in relation to context enhanced searching. The storage module 780 can include a resource description framework (RDF) indices module 783 as can be used for indices in relation to information, such as from various web sources, as can be used in context enhanced searching for query resolution. Further, the storage module 780 can include an in-memory cache module 784 as can be used in relation to storage of information in a memory of the user device 704, such as data or data objects, for example, in relation to context enhanced searching. A notification management module 785 as can be used for configuration or status information in relation to context enhanced searching can also be included in the storage module 780. Further, an RDF data module 786 can also be included in the storage module 780 as can be used for RDF data in relation to query resolution for context enhanced searching.

As evident from the discussion above, various general designs and general functions of the user device 704, the Distributed Data Device Provider 708, and the backend 730 include those typically as would be known to one of skill in the art. However, as to the additional novel features and functions of the exemplary embodiments described herein with respect to context enhanced searching, that are not generally known to one of skill in the art, such novel features and functions can be implemented with the knowledge and guidance of the disclosure herein in view of generally known designs and functions.

The memory and processor of the user device 704, such as can be included in the Distributed Data Device Provider 708, can be used in conjunction with the backend 730 to evaluate the state trajectories of the stored dynamic ordered tree structures of that client device, to determine potential points, such as map tiles, that likely are needed for resolution of the query or queries, and in implementing traversing state trajectories for tree transition index structures, such as to adjust for a transition in location, status or criteria, according to exemplary embodiments.

In implementing the evaluation and transition of state trajectories of dynamic ordered tree index structures, such as R-trees, associated with the user device 704, to resolve a query generated by the user device 704, in terms of the common data platform (e.g., distributed data) of the Distributed Data Device Provider 708, an interaction typically occurs between the user device 704 and the backend 730 system of record. Data is received from the backend 730 on behalf of a user principal, such as user 702. This data is then filtered in accordance with the agent 706, such as according to an accessing agent of agent 706, and ultimately returned to the agent 706 for display and interaction with and by the user principal 702.

When the application for implementing context enhanced searching, according to exemplary embodiments, such as in the user device 704, initiates a read operation (Read, Find, Query) some aspect of the result of the query typically can likely be obtained from the device cache 710 (via the storage layer), such as can be included in the Distributed Data Device Provider 708, and the backend platform of the backend provider (BP) 732. Initially, local cached results are identified and held within the data convergence buffer 771 of the Distributed Data Device Provider 708. As results for the user device generated query from the backend platform of the backend provider 732 become available, these results are also routed through the convergence area, such as can be included in the distribution module 770, of the Distributed Data Device Provider 708, which enables filtering of duplicate entries, as well as sorting of results sets.

The data convergence area, such as can be included in the distribution module 770 of the Distributed Data Device Provider 708 of the user device 704, typically can be a non-volatile memory space, or other suitable memory storage, such as a flash memory, which is used as a holding place when a dynamic ordered tree structure node, such as an R-tree node is inserted, deleted, or modified, or as a holding place for any newly generated objects from both the backend platform of the backend provider 732 and the storage of the user device 704. In this regard, according to exemplary embodiments, on the client side, such as at the user device 704, the data convergence buffer, or conversion buffer, 771 in the Distributed Data Device Provider 708 can be maintained in a graph like manner a number of state trajectories indexes for dynamic ordered tree structures, such as R-trees, so as to facilitate a relatively high context cache for the implementation of the context enhanced searching operation or process. The data convergence buffer 771 in the Distributed Data Device Provider 708 can be dynamically allocated, such as in a size of about 1 byte up to about 8 gigabytes, for example, although the buffer size should not be construed in a limiting sense. The data convergence buffer 771 in the Distributed Data Device Provider 708 can be of any suitable size, depending upon the use and application in context enhanced searching, as well as depending on other factors, such as cost considerations.

Also, according to exemplary embodiments, user device 704 and the backend provider 730 can facilitate and enhance the ability to share and traverse multidimensional data between multiple devices. In this regard, for context enhanced searching, there can be a benefit using a normal memory behind in the background mantle. Additionally, with a number of appliances that are collecting the hops, typically those appliances can have a number of slots equipped with disks and so as to patch them and interface to block interfaces, as well as to relatively high P interfaces, to facilitate enabling netting the devices as a stream like devices, for example.

Further, according to exemplary embodiments, the foundation application program interfaces (API's) Find Operation, such as can be included in the API 709, as can be used for locating or finding data for context enhanced searching, according to exemplary embodiments, can provide an application, such as operating on the user device 704 in conjunction with the backend 730, for context enhanced searching, in relation to various exemplary processes or methods to control how a user 702 of user device 704 would like to receive search results, such as via the 'resultDelivery' parameter of the application, for example, for generating and resolving queries. And FIGS. 7C, 7D and 7E are schematic diagrams of exemplary process flows in providing search results implementing context enhancing searching using dynamic ordered tree structures in relation to the user device 704 communicating with the backend 730, according to exemplary embodiments. In FIGS. 7C, 7D and 7E, the exemplary process flow is generally indicated in relation to the agent 706, the API 709 and device store 710 included in the Distributed Data Device Provider 708 of the user device 704, and in relation to the backend store 734 included in the backend provider 732 of the backend 730, for example, according to exemplary embodiments.

FIG. 7C illustrates and exemplary process flow for generating and receiving search results for a query in a "wait for all mode". Referring to FIG. 7C, for example, for the "wait for all mode", the local cached results are obtained first (via the storage layer) and then held within the convergence area, such as included in the Distributed Data Device Provider 708, of the user device 704. Subsequently, once the backend platform of the backend provider 732 provides any satisfying results, these are then merged, filtered (duplicates removed) and potentially sorted (depending on the use of the 'sortOrder' parameter) before the entire result set is delivered to the agent 706 of user device 704 as a single response. In this way, the entire results set for the query will be temporarily held in memory (such as in the data convergence buffer 771 of the Distributed Data Device Provider 708). Once the results are delivered to the agent 706, such as for presentation to the user 702, any resources that have been reserved by the convergence area (for this operation) can be released.

FIG. 7D illustrates and exemplary process flow for generating and receiving search results for a query in a "partial updates mode". Referring to FIG. 7D, for example, for the "partial updates mode", the data convergence buffer 771 of the Distributed Data Device Provider 708 is initially seeded with local cache results and these results are (potentially) sorted and immediately returned to the agent 706, such as for display to the user 702. In the "partial updates mode", the data convergence buffer 771 memory associated with the operation is typically not released—the result set remains in the memory. Once results are available from the backend 730, the two sets of results are compared, such as by the Distributed Data Device Provider 708. And results from the backend 730 that duplicate those already within the data convergence buffer 771 (i.e. the local cache results) are discarded, since these duplicate values that have already been provided to the agent 706. The subset of unique results (from the backend 730) are then returned to the agent 706, such as for display to a user 702, and the convergence resources associated with the "partial updates mode" operation are typically released.

FIG. 7E illustrates and exemplary process flow for generating and receiving search results for a query in a "full updates mode". Referring to FIG. 7E, for example, in the "full updates mode", the behavior and operation of the data convergence buffer 771 in the Distributed Data Device Provider 708 in this mode is very similar to the previous "partial updates mode". However, the difference in the "full updates mode" being the final delivery of the backend platform in the backend provider 732 results to the agent 706. In the "full updates mode", instead of returning just the subset of unique backend results, the convergence area, such as included in the Distributed Data Device Provider 708, prepares a total union of backend and cached results and returns the complete set to the agent 706, such as for display to a user 702 (before releasing convergence buffer resources associated with the operation).

The exemplary processes and embodiments described herein for providing context enhanced searching by implementing, transitioning and traversing state trajectories for dynamically ordered tree structures indexes, such as R-tree index structures, can be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
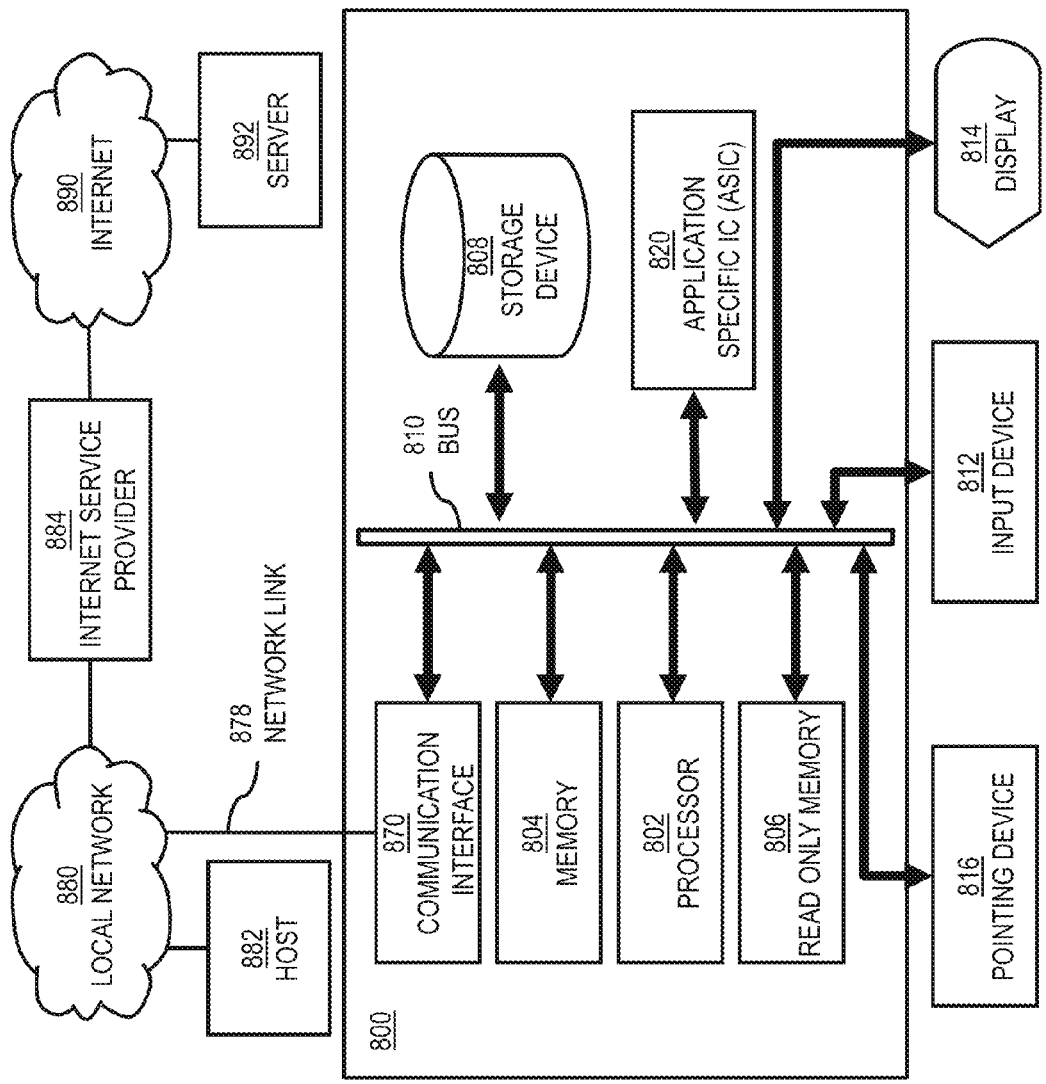
FIG. 8 is a diagram of hardware, as well as including firmware, of a computer system in a content delivery network that can be used to implement context enhancing searching using dynamic ordered tree structures in an embodiment of the invention.

FIG. 8 illustrates a computer system 800 upon which an embodiment of the invention can be implemented. Although computer system 800 is depicted with respect to a particular device or equipment, it is contemplated that other devices or equipment (e.g., network elements, servers, etc.) within FIG. 8 can deploy the illustrated hardware and components of computer system 800. Computer system 800 is programmed (e.g., via computer program code or instructions) to provide dynamic ordered tree index structures and transition index structures, such as for enhanced context searching, as described herein, and includes a communication mechanism such as a bus 810 for passing information and data between other internal and external components of the computer system 800. Computer system 800, or a portion thereof, constitutes a means for performing one or more steps of providing dynamically ordered tree index structures and transition index structures, according to exemplary embodiments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing dynamically ordered tree index structures and transition index structures, according to exemplary embodiments. The computer program code is a set of instructions or statements providing instructions for the operation of the processor and/or the computer system to perform specified functions. The code, for example, can be written in a computer programming language that is compiled into a native instruction set of the processor. The code can also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors can be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing dynamic ordered tree index structures and transition index structures, according to exemplary embodiments. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing dynamically ordered tree index structures and transition index structures, according to exemplary embodiments, is provided to the bus 810 for use by the processor 802 from an external input device 812, such as a keyboard containing alphanumeric keys operated by a human user. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 can perform all functions automatically without human input, one or more of external input device 812, display device 814 and pointing device 816 can be omitted, for example.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such can perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 can be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 can be a local area network (LAN) card to provide a data communication connection to a compatible LAN, such as Ethernet. Wireless links can also be implemented. For wireless links, the communications interface 870 sends or receives or both sends and receives electrical, acoustic or electromagnetic signals, including infrared and optical signals, which carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 can enable connection to the communication network 105 (FIG. 1) for providing dynamic ordered tree index structures and transition index structures, such as for enhanced context searching, according to exemplary embodiments.

The term "computer-readable medium" as used herein refers to any medium that participates in providing information to processor 802, including instructions for execution. Such a medium can take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 can provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, can be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, can be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code can be executed by processor 802 as it is received, or can be stored in memory 804 or in storage device 808 or any other non-volatile storage for later execution, or both. In this manner, computer system 800 can obtain application program code in the form of signals on a carrier wave, for example.

Various forms of computer readable media can be involved in carrying one or more sequence of instructions or data or both to processor 802 for execution. For example, instructions and data can initially be carried on a magnetic disk of a remote computer such as host 882. The remote computer loads the instructions and data into its dynamic memory and sends the instructions and data over a telephone line using a modem, for example. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 can optionally be stored on storage device 808, either before or after execution by the processor 802.

FIG. 9 illustrates a chip set or chip 900 upon which an embodiment of the invention can be implemented. Chip set 900 can be programmed to implement providing dynamic ordered tree index structures and transition index structures, according to exemplary embodiments, as described herein, and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, can constitute a means for performing one or more steps of providing user interface navigation information associated with the availability of functions. Chip set or chip 900, or a portion thereof, can constitute a means for performing one or more steps for providing dynamically ordered tree index structures and transition index structures, according to exemplary embodiments.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 can include one or more processing cores with each core configured to perform independently. A multi-core processor enables multiprocessing within a single physical package. Examples of a multi-core processor include two, four, eight, or greater numbers of processing cores. Alternatively or in addition, the processor 903 can include one or more microprocessors configured in tandem via the bus 901 to enable independent execution of instructions, pipelining, and multithreading. The processor 903 can also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein can include one or more field programmable gate arrays (FPGA), one or more controllers, or one or more other special-purpose computer chips, for example.

In one embodiment, the chip set or chip 900 can include merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a range ordered tree structure. The memory 905 also stores the data associated with or generated by the execution of the inventive steps.

Figure 10:
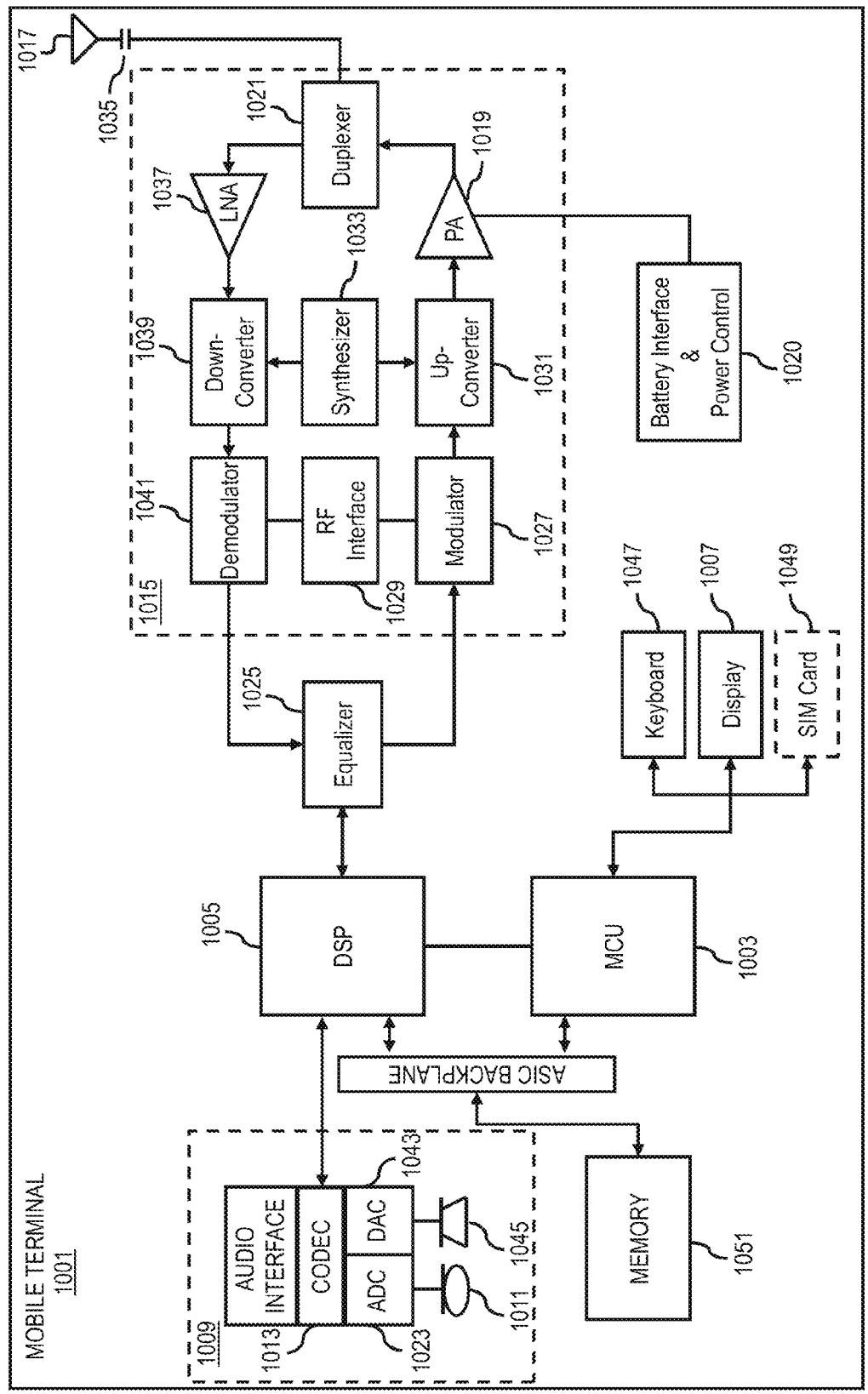
FIG. 10 is a diagram of a mobile terminal (e.g., handset) that can be used to implement context enhancing searching using dynamic ordered tree structures in an embodiment of the invention.

FIG. 10 is a diagram of exemplary components of a mobile terminal (e.g., handset) for communications, which is capable of operating in the system of FIG. 1, according to one embodiment, such as user equipment 101*a-n*. In some embodiments, mobile terminal 1001, or a portion thereof, can constitute a means for performing one or more steps of providing dynamically ordered tree index structures and transition index structures for and in implementing context enhanced searching, according to exemplary embodiments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a range ordered tree structure. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The MCU 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof, for example.

The encoded signals are then routed to an equalizer 1025 for compensation of any frequency-dependent impairments that occur during transmission though the air, such as phase and amplitude distortion. After equalizing the bit stream, the modulator 1027 combines the signal with a RF signal generated in the RF interface 1029. The modulator 1027 typically generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals can be forwarded from there to a remote telephone which can be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU), for example.

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide dynamically ordered tree index structures and transition index structures, according to exemplary embodiments, for and to implement context enhanced searching. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 can, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 cam be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 can carry, for instance, important information, such as the cellular phone number, the carrier supplying service, subscription details, and security information. The SIM card 1049 serves primarily to identify the mobile terminal 1001 on a radio network. The card 1049 typically also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    in response to one or more changes of context associated with a device, a user of the device, or a combination thereof, generating, by an apparatus, at least one transition index structure via projecting a transition of the device into at least one index structure, wherein the context includes one or more user trip characteristics and locations, and the transition of the device includes the one or more changes of the context;
    associating, by the apparatus, the at least one transition index structure with one or more index objects corresponding to a sub-set of spatially related data objects associated with the at least one index structure, one or more other data objects, or a combination thereof and in response to a query for one or more of the spatially related data objects, searching, by the apparatus, via the at least one transition index structure to resolve the query.

2. The method of claim 1, further comprising:
    synchronizing a storage of the device with a data store; and
    as part of the synchronizing, receiving, at the device via a network, the sub-set of the spatially related data objects, the spatially related data objects, the one or more other data objects, the at least one index structure, the at least one transition index structure, or a combination thereof.

3. The method of claim 1, wherein the at least one index structure, the at least one transition index structure, or a combination thereof, are generated at the device, and the method further comprising:
    synchronizing a storage of the device with a data store; and
    as part of the synchronizing, transmitting from the device the at least one index structure, the at least one transition index structure, or a combination thereof, to the data store via a network.

4. The method of claim 3, wherein the data store is formed over a plurality of nodes of the network.

5. The method of claim 1, further comprising:
    caching, at a storage of the device, the sub-set of the spatially related data objects, the spatially related data objects, the one or more other data objects, the at least one index structure, the at least one transition index structure, or a combination thereof,
    wherein at least one of the generating step, the associating step, and the searching step, is performed at the device.

6. The method of claim 5, wherein each of the one or more index objects includes a pointer for retrieving a corresponding one of the one or more of the spatially related data objects from a data store, the storage of the device, or a combination thereof.

7. The method of claim 1, wherein the at least one index structure and the at least one transition index structure are each a multidimensional tree structure, and the one or more index objects are nodes of the multidimensional tree structure.

8. The method of claim 7, wherein the multidimensional tree structure is an R-tree and the one or more index objects comprise map tiles.

9. An apparatus comprising:
    at least one processor; and
    at least one memory including computer program code for one or more programs, the at least one memory and the computer program code configured to, with the at least one processor, cause the apparatus to perform at least the following:
    in response to one or more changes of context associated with a device, a user of the device, or a combination thereof, generate at least one transition index structure via projecting a transition of the device into at least one index structure, wherein the context includes one or more user trip characteristics and locations, and the transition of the device includes the one or more changes of the context;
    associate the at least one transition index structure with one or more index objects corresponding to a sub-set of spatially related data objects associated with the at least one index structure, one or more other data objects, or a combination thereof; and in response to a query for one or more of the spatially related data objects, search via the at least one transition index structure to resolve the query.

10. The apparatus of claim 9, wherein the apparatus is further caused to:
synchronize a storage of the device with a data store; and
as part of the synchronizing, receive, at the device via a network, the sub-set of the spatially related data objects, the spatially related data objects, the one or more other data objects, the at least one index structure, the at least one transition index structure, or a combination thereof.

11. The apparatus of claim 9, wherein the at least one index structure, the at least one transition index structure, or a combination thereof, are generated at the device, and the method further comprising:
synchronize a storage of the device with a data store; and
as part of the synchronizing, transmit from the device the at least one index structure, the at least one transition index structure, or a combination thereof, to the data store via a network.

12. The apparatus of claim 11, wherein the data store is formed over a plurality of nodes of the network.

13. The apparatus of claim 9, wherein the apparatus is further caused to:
cache, at a storage of the device, the sub-set of the spatially related data objects, the spatially related data objects, the one or more other data objects, the at least one index structure, the at least one transition index structure, or a combination thereof,
wherein at least one of the generating, the associating, and the searching, is performed at the device.

14. The apparatus of claim 13, wherein each of the one or more index objects includes a pointer for retrieving a corresponding one of the one or more of the spatially related data objects from a data store, the storage of the device, or a combination thereof.

15. The apparatus of claim 9, wherein the at least one index structure and the at least one transition index structure are each a multidimensional tree structure, and the one or more index objects are nodes of the multidimensional tree structure.

16. The apparatus of claim 15, wherein the multidimensional tree structure is an R-tree and the one or more index objects comprise map tiles.

17. A non-transitory computer-readable storage medium carrying one or more sequences of one or more instructions which, when executed by one or more processors, cause an apparatus to at least perform the following steps:
in response to one or more changes of context associated with a device, a user of the device, or a combination thereof, generating at least one transition index structure via projecting a transition of the device into at least one index structure, wherein the context includes one or more user trip characteristics and locations, and the transition of the device includes the one or more changes of the context;
associating the at least one transition index structure with one or more index objects corresponding to a sub-set of spatially related data objects associated with the at least one index structure, one or more other data objects, or a combination thereof; and
in response to a query for one or more of the spatially related data objects, searching via the at least one transition index structure to resolve the query.

18. The non-transitory computer-readable storage medium of claim 17, wherein the apparatus is caused to further perform:
synchronizing a storage of the device with a data store; and
as part of the synchronizing, receiving, at the device via a network, the sub-set of the spatially related data objects, the spatially related data objects, the one or more other data objects, the at least one index structure, the at least one transition index structure, or a combination thereof.

19. The non-transitory computer-readable storage medium of claim 17, wherein the at least one index structure, the at least one transition index structure, or a combination thereof, are generated at the device, and the apparatus is caused to further perform:
synchronizing a storage of the device with a data store; and
as part of the synchronizing, transmitting from the device the at least one index structure, the at least one transition index structure, or a combination thereof, to the data store via a network.

20. The non-transitory computer-readable storage medium of claim 19, wherein the data store is formed over a plurality of nodes of the network.

* * * * *